(12) United States Patent
Murphy et al.

(10) Patent No.: US 11,463,368 B2
(45) Date of Patent: *Oct. 4, 2022

(54) RATE LIMITER

(71) Applicant: eBay Inc., San Jose, CA (US)

(72) Inventors: Ronald Francis Murphy, Pleasanton, CA (US); Vijayarengan Janakiraman, Trichy (IN); Chanchal Subhash, Bangalore (IN); Surya Kaleeswaran, Chennai (IN)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/211,528

(22) Filed: Mar. 24, 2021

(65) Prior Publication Data
US 2021/0211383 A1    Jul. 8, 2021

Related U.S. Application Data

(63) Continuation of application No. 16/722,921, filed on Dec. 20, 2019, now Pat. No. 10,992,586, which is a (Continued)

(51) Int. Cl.
*H04L 29/08* (2006.01)
*H04L 47/25* (2022.01)
(Continued)

(52) U.S. Cl.
CPC .............. *H04L 47/25* (2013.01); *H04L 67/02* (2013.01); *H04L 67/10* (2013.01); *H04L 67/125* (2013.01);
(Continued)

(58) Field of Classification Search
CPC ........ H04L 47/70; G06F 9/5011; G06F 9/505; G06F 17/30657
See application file for complete search history.

(56) References Cited

U.S. PATENT DOCUMENTS 10,554,564 B2    2/2020  Murphy et al.
10,992,586 B2 *  4/2021  Murphy ................ H04L 67/125
(Continued)

FOREIGN PATENT DOCUMENTS

WO    2018/157109 A1    8/2018

OTHER PUBLICATIONS

First Action Interview—Office Action Summary received for U.S. Appl. No. 15/442,938, dated Feb. 15, 2019, 3 pages.
(Continued)

*Primary Examiner* — Kim T Nguyen
(74) *Attorney, Agent, or Firm* — FIG. 1 Patents

(57) ABSTRACT

Systems and methods of rate limiting are disclosed herein. In some example embodiments, a rate limiter service receives a request from an online application to access an online resource, and the rate limiter service transmits an indication of the request to a back end system, and an enforcement decision corresponding to the online resource is received from the back end system, with the enforcement decision comprising an instruction to either permit or deny access to the online resource, and the receiving of the enforcement decision from the back end system being performed asynchronously with the receiving of the request and the transmitting of the indication. In some example embodiments, the enforcement decision received from the back end system is stored, the stored enforcement decision is accessed in response to the receiving of the request, and the request is responded to using the accessed enforcement decision.

20 Claims, 17 Drawing Sheets

Related U.S. Application Data continuation of application No. 15/442,938, filed on Feb. 27, 2017, now Pat. No. 10,554,564.

(51) Int. Cl.
| | | |
|---|---|---|
| *H04L 67/02* | (2022.01) | |
| *H04L 67/125* | (2022.01) | |
| *H04L 67/10* | (2022.01) | |
| *H04L 67/53* | (2022.01) | |
| *H04L 47/20* | (2022.01) | |
| *H04L 47/80* | (2022.01) | |

(52) U.S. Cl.
CPC .............. *H04L 67/53* (2022.05); *H04L 47/20* (2013.01); *H04L 47/808* (2013.01)

(56) References Cited

U.S. PATENT DOCUMENTS

| | | |
|---|---|---|
| 2009/0164632 A1 | 6/2009 | Kumar et al. |
| 2010/0260044 A1 | 10/2010 | Gormley |
| 2011/0238838 A1* | 9/2011 | Avalani ................... G06F 9/505 709/226 |
| 2015/0263987 A1 | 9/2015 | Klein et al. |
| 2015/0372954 A1 | 12/2015 | Dubman et al. |
| 2018/0248807 A1 | 8/2018 | Murphy et al. |
| 2020/0127928 A1 | 4/2020 | Murphy et al. |

OTHER PUBLICATIONS

First Action Interview—Pre-Interview Communication received for U.S. Appl. No. 15/442,938, dated Nov. 1, 2018, 4 pages.
Notice of Allowance received for U.S. Appl. No. 15/442,938, dated Sep. 23, 2019, 7 pages.
Final Office Action Received for U.S. Appl. No. 16/722,921, dated Nov. 18, 2020, 7 pages.
Non-Final Office Action Received for U.S. Appl. No. 16/722,921, dated Aug. 6, 2020, 8 pages.
Notice of Allowance Received for U.S. Appl. No. 16/722,921, dated Jan. 29, 2021, 5 pages.
International Preliminary Report on Patentability received for PCT Application No. PCT/US2018/019880, dated Sep. 6, 2019, 10 pages.
International Search Report received for PCT Patent Application No. PCT/US2018/019880, dated Apr. 24, 2018, 2 pages.
International Written Opinion received for PCT Patent Application No. PCT/US2018/019880, dated Apr. 24, 2018, 8 pages.

\* cited by examiner

RATE LIMITER

RELATED APPLICATIONS

This application is a Continuation of U.S. application Ser. No. 16/722,921, Filed Dec. 20, 2019, which is a Continuation of U.S. application Ser. No. 15/442,938, filed Feb. 27, 2017, which are hereby incorporated by reference in their entirety.

TECHNICAL FIELD

Embodiments of the present disclosure relate generally to the technical field of electronic communications and, more particularly, but not by way of limitation, to systems and methods of rate limiting for electronic resources.

BACKGROUND

Providing consumers with access to online or other electronic resources may impact a resource provider's infrastructure. When multiple resources are requested and provided to multiple consumers, the weights or costs associated with the requests add up, and can thus lead to a decrease in overall system performance. For example, in the context of a network-based application platform such as a publishing platform or a marketplace platform, a resource consumer may submit a query request that requires a number of resources, such as some processing by a database server. The processing by the database server needed by the query may have certain associated costs that may be measured, for example, by the amount of time (e.g., processing time), memory, bandwidth, storage, or other computing resources. When a number of query requests and other requests require processing from the database server (e.g., record creation requests, record modification requests, record deletion requests, database management requests, etc.), the costs for a database server may approach or even exceed the database server's limits on its capabilities. Furthermore, responding to certain requests may impose different burdens on varying resources, and differing degrees of burden on the infrastructure than responding to other requests (e.g., querying a database may require substantially more processing than a webpage request). Overuse or abuse by a resource consumer may ultimately degrade the infrastructure's ability to serve other resource consumers.

BRIEF DESCRIPTION OF THE DRAWINGS

Some embodiments of the present disclosure are illustrated by way of example and not limitation in the figures of the accompanying drawings, in which like reference numbers indicate similar elements.

DETAILED DESCRIPTION

Figure 1:
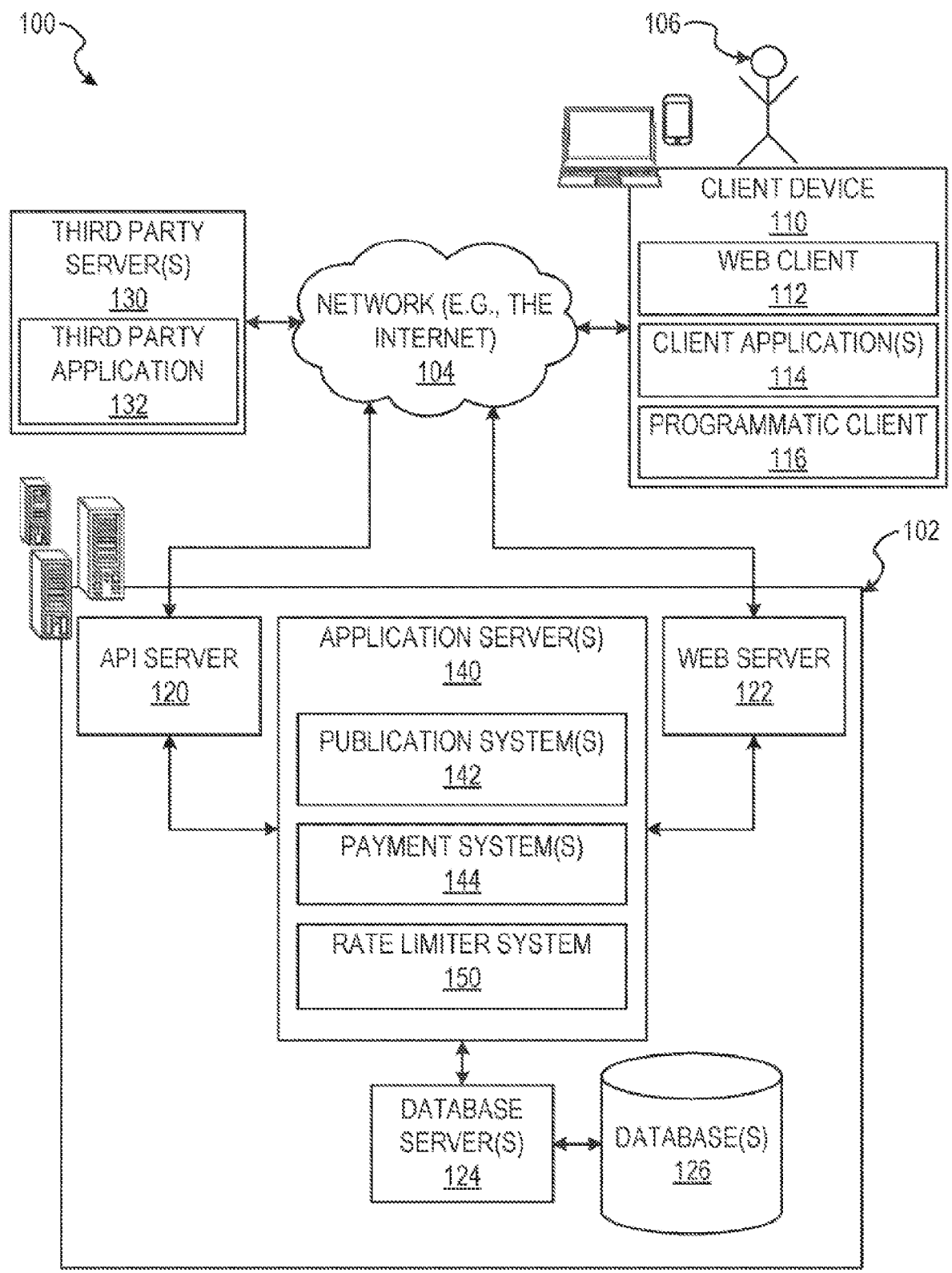
FIG. 1 is a block diagram illustrating a networked system, in accordance with some example embodiments.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter can be practiced without these specific details. In general, well-known instruction instances, protocols, structures, and techniques have not been shown in detail.

The present disclosure provides technical solutions for rate limiting for electronic resources (e.g., online services). The methods or embodiments disclosed herein can be implemented as a computer system having one or more modules (e.g., hardware modules or software modules). Such modules can be executed by one or more processors of the computer system. The methods or embodiments disclosed herein can be embodied as instructions stored on a machine-readable medium that, when executed by one or more processors, cause the one or more processors to perform the instructions.

In some example embodiments, a rate limiter service receives a request from an online application to access an online resource, and the rate limiter service transmits an indication of the request to a back end system, and an enforcement decision corresponding to the online resource is received from the back end system, with the enforcement decision comprising an instruction to either permit or deny access to the online resource, and the receiving of the enforcement decision from the back end system being performed asynchronously with the receiving of the request and the transmitting of the indication. In some example embodiments, the enforcement decision received from the back end system is stored, the stored enforcement decision is accessed in response to the receiving of the request, and the request is responded to using the accessed enforcement decision.

In some example embodiments, the back end system determines the enforcement decision based on a history of usage of the online resource and one or more rules, with the determining of the enforcement decision being performed asynchronously with the transmitting of the indication of the request by the rate limiter service.

In some example embodiments, the back end system transmits the enforcement decision to the rate limiter service asynchronously with the transmitting of the indication of the request by the rate limiter service, the rate limiter service stores the enforcement decision, the rate limiter service accesses the stored enforcement decision in response to the receiving of the request, and the responding to the request using the accessed enforcement decision comprises transmitting the accessed enforcement decision to an enforcement module of the online application, with the enforcement module being configured to implement the enforcement decision.

In some example embodiments, the back end system transmits the enforcement decision to an enforcement module of the online application asynchronously with the transmitting of the indication of the request by the rate limiter service, the enforcement module of the online application stores the enforcement decision, the enforcement module of the online application accesses the stored enforcement decision in response to the receiving of the request, and the responding to the request using the accessed enforcement decision comprises implementing, by the enforcement module of the online application, the enforcement decision.

In some example embodiments, the one or more rules comprises one or more of a maximum limit of requests that can be serviced within a predetermined period of time, a maximum limit of a type of request that can be serviced within a predetermined period of time, a maximum limit of requests or types of requests associated with a single Internet Protocol (IP) address that can be serviced within a predetermined period of time, and a maximum limit of requests or types of requests associated with a particular mobile device that can be serviced within a predetermined period of time.

In some example embodiments, the indication of the request indicates a type of the request.

In some example embodiments, the online application comprises a web application.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), an application 114, and a programmatic client 116 executing on client device 110.

The client device 110 may comprise, but are not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment, etc.). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application program interface (API) server 120 and a web server 122 are coupled to, and provide programmatic and web interfaces respectively to, one or more application servers 140. The application servers 140 may host one or more publication systems 142, payment systems 144, and rate limiter system 150, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication systems 142 may provide a number of publication functions and services to users 106 that access the networked system 102. The payment systems 144 may likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The rate limiter system 150 provides functionality operable to perform various rate limiting operations, as will be discussed in further detail below. The rate limiter system 150 may access the data from the databases 126, the third party servers 130, the publication system 142, and other sources. In some example embodiments, the rate limiter system 150 may analyze the data to perform rate limiting operations. In some example embodiments, the rate limiter system 150 communicates with the publication systems 142 (e.g., accessing item listings) and payment system 144. In an alternative embodiment, the rate limiter system 150 is a part of the publication system 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142, payment system 144, and rate limiter system 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Additionally, a third party application(s) 132, executing on a third party server(s) 130, is shown as having programmatic access to the networked system 102 via the programmatic interface provided by the API server 120. For example, the third party application 132, utilizing information retrieved from the networked system 102, may support one or more features or functions on a website hosted by the third party. The third party web site may, for example, provide one or more promotional, marketplace, or payment functions that are supported by the relevant applications of the networked system 102.

Figure 2:
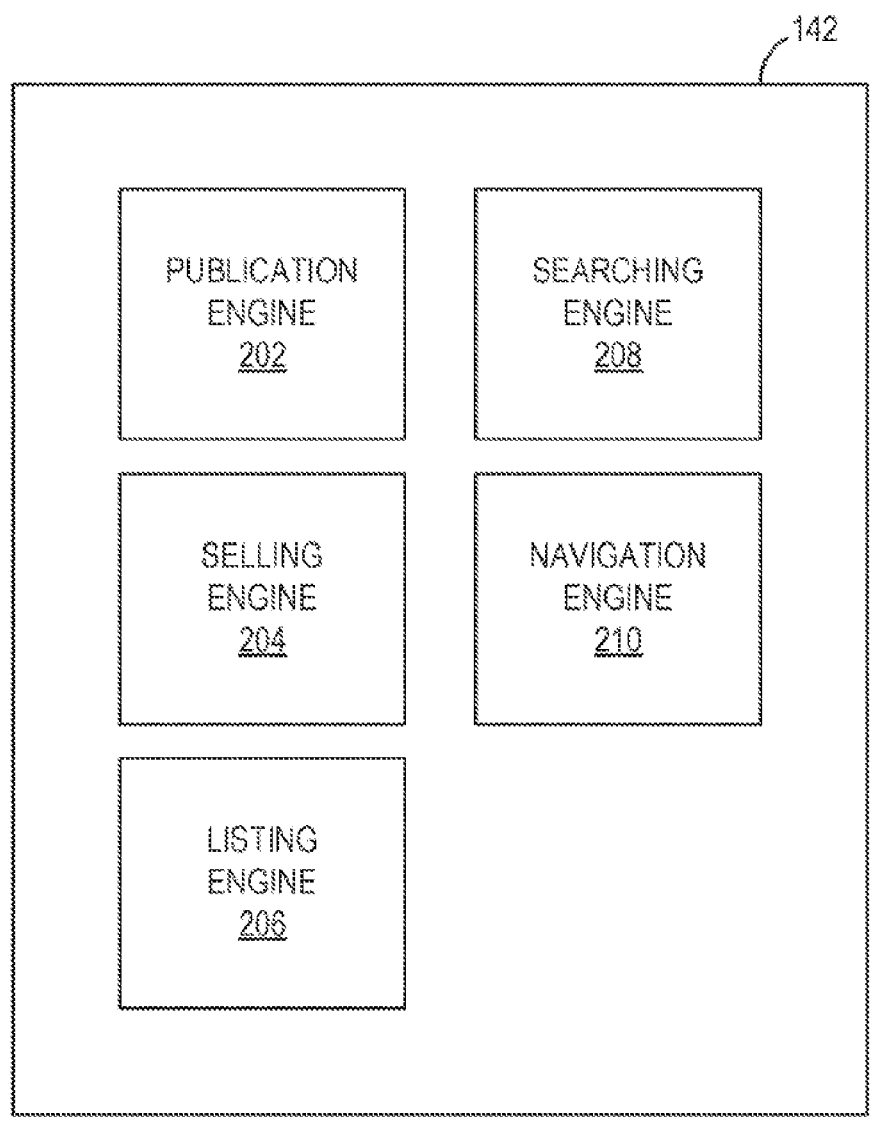
FIG. 2 is a block diagram illustrating various components of a network-based publication system, in accordance with some example embodiments.

FIG. 2 is a block diagram illustrating various components of the network-based publication system 142, in accordance with some example embodiments. The publication system 142 can be hosted on dedicated or shared server machines that are communicatively coupled to enable communications between server machines. The components themselves are communicatively coupled (e.g., via appropriate interfaces) to each other and to various data sources, so as to allow information to be passed between the components or so as to allow the components to share and access common data. Furthermore, the components can access one or more databases 126 via the database servers 124.

The publication system 142 can provide a number of publishing, listing, and/or price-setting mechanisms whereby a seller (also referred to as a first user) can list (or publish information concerning) goods or services for sale or barter, a buyer (also referred to as a second user) can express interest in or indicate a desire to purchase or barter such goods or services, and a transaction (such as a trade) can be completed pertaining to the goods or services. To this end, the publication system 142 can comprise at least one publication engine 202 and one or more selling engines 204. The publication engine 202 can publish information, such as item listings or product description pages, on the publication system 142. In some embodiments, the selling engines 204 can comprise one or more fixed-price engines that support fixed-price listing and price setting mechanisms and one or more auction engines that support auction-format listing and price setting mechanisms (e.g., English, Dutch, Chinese, Double, Reverse auctions, etc.). The various auction engines can also provide a number of features in support of these auction-format listings, such as a reserve price feature whereby a seller can specify a reserve price in connection with a listing and a proxy-bidding feature whereby a bidder can invoke automated proxy bidding. The selling engines 204 can further comprise one or more deal engines that support merchant-generated offers for products and services.

A listing engine 206 allows sellers to conveniently author listings of items or authors to author publications. In one embodiment, the listings pertain to goods or services that a user (e.g., a seller) wishes to transact via the publication system 142. In some embodiments, the listings can be an offer, deal, coupon, or discount for the good or service. Each good or service is associated with a particular category. The listing engine 206 can receive listing data such as title, description, and aspect name/value pairs. Furthermore, each listing for a good or service can be assigned an item identifier. In other embodiments, a user can create a listing that is an advertisement or other form of information publication. The listing information can then be stored to one or more storage devices coupled to the publication system 142 (e.g., databases 126). Listings also can comprise product description pages that display a product and information (e.g., product title, specifications, and reviews) associated with the product. In some embodiments, the product description page can include an aggregation of item listings that correspond to the product described on the product description page.

The listing engine 206 can also allow buyers to conveniently author listings or requests for items desired to be purchased. In some embodiments, the listings can pertain to goods or services that a user (e.g., a buyer) wishes to transact via the publication system 142. Each good or service is associated with a particular category. The listing engine 206 can receive as much or as little listing data, such as title, description, and aspect name/value pairs, that the buyer is aware of about the requested item. In some embodiments, the listing engine 206 can parse the buyer's submitted item information and can complete incomplete portions of the listing. For example, if the buyer provides a brief description of a requested item, the listing engine 206 can parse the description, extract key terms, and use those terms to make a determination of the identity of the item. Using the determined item identity, the listing engine 206 can retrieve additional item details for inclusion in the buyer item request. In some embodiments, the listing engine 206 can assign an item identifier to each listing for a good or service.

In some embodiments, the listing engine 206 allows sellers to generate offers for discounts on products or services. The listing engine 206 can receive listing data, such as the product or service being offered, a price and/or discount for the product or service, a time period for which the offer is valid, and so forth. In some embodiments, the listing engine 206 permits sellers to generate offers from the sellers' mobile devices. The generated offers can be uploaded to the publication system 142 for storage and tracking.

Searching the publication system 142 is facilitated by a searching engine 208. For example, the searching engine 208 enables keyword queries of listings published via the publication system 142. In example embodiments, the searching engine 208 receives the keyword queries from a device of a user and conducts a review of the storage device storing the listing information. The review will enable compilation of a result set of listings that can be sorted and returned to the client device 110 of the user. The searching engine 208 can record the query (e.g., keywords) and any subsequent user actions and behaviors (e.g., navigations).

The searching engine 208 also can perform a search based on the location of the user. A user can access the searching engine 208 via a mobile device and generate a search query. Using the search query and the user's location, the searching engine 208 can return relevant search results for products, services, offers, auctions, and so forth to the user. The searching engine 208 can identify relevant search results both in a list form and graphically on a map. Selection of a graphical indicator on the map can provide additional details regarding the selected search result. In some embodiments, the user can specify as part of the search query a radius or distance from the user's current location to limit search results.

The searching engine 208 also can perform a search based on an image. The image can be taken from a camera or imaging component of a client device or can be accessed from storage.

In a further example, a navigation engine 210 allows users to navigate through various categories, catalogs, or inventory data structures according to which listings can be classified within the publication system 142. For example, the navigation engine 210 allows a user to successively navigate down a category tree comprising a hierarchy of categories (e.g., the category tree structure) until a particular set of listings is reached. Various other navigation applications within the navigation engine 210 can be provided to supplement the searching and browsing applications. The navigation engine 210 can record the various user actions (e.g., clicks) performed by the user in order to navigate down the category tree.

Figure 3:
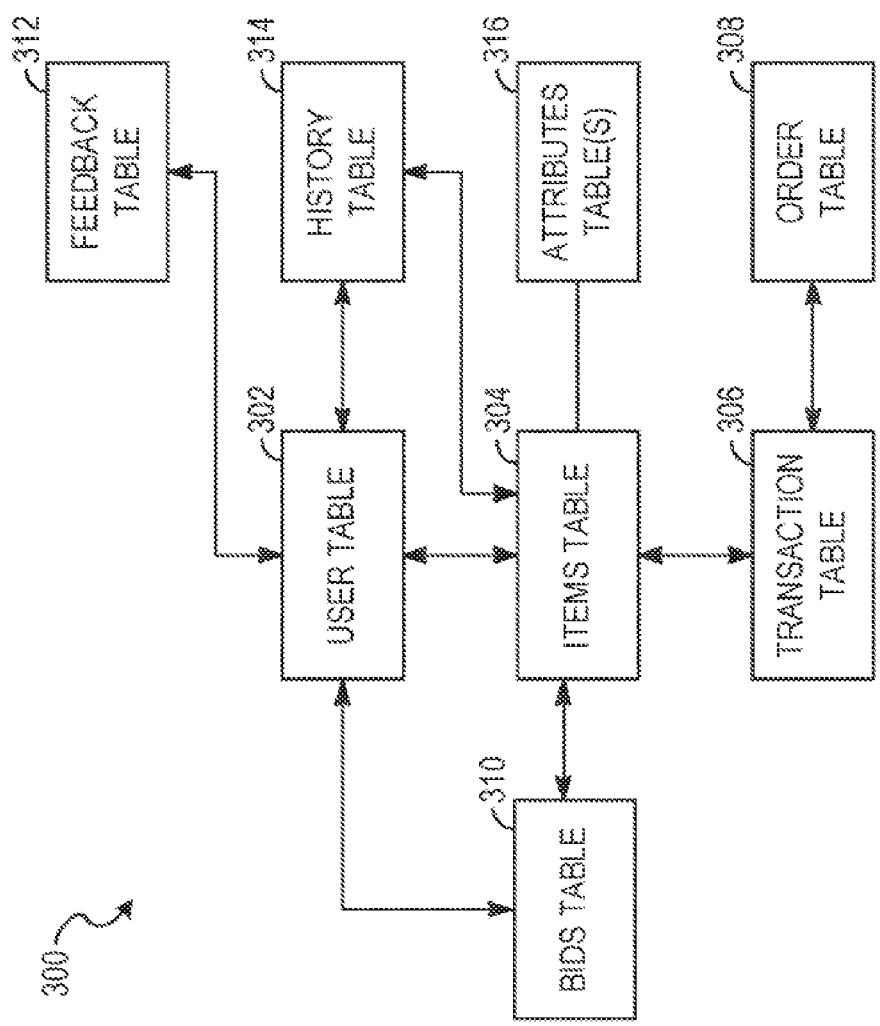
FIG. 3 is a block diagram illustrating various tables that can be maintained within a database, in accordance with some example embodiments.

FIG. 3 is a high-level entity-relationship diagram, illustrating various tables 300 that can be maintained within the database(s) 126, and that are utilized by and support the systems 142, 144, and 150. A user table 302 contains a record for each registered user of the networked system 102, and can include identifier, address and financial instrument information pertaining to each such registered user. A user can operate as a seller, a buyer, or both, within the networked system 102. In one example embodiment, a buyer can be a user that has accumulated value (e.g., commercial or proprietary currency), and is accordingly able to exchange the accumulated value for items that are offered for sale by the networked system 102.

The tables 300 also include an items table 304 in which are maintained item records for goods and services that are available to be, or have been, transacted via the networked system 102. Each item record within the items table 304 can furthermore be linked to one or more user records within the user table 302, so as to associate a seller and one or more actual or potential buyers with each item record.

A transaction table 306 contains a record for each transaction (e.g., a purchase or sale transaction) pertaining to items for which records exist within the items table 304.

An order table 308 is populated with order records, with each order record being associated with an order. Each order, in turn, can be associated with one or more transactions for which records exist within the transaction table 306.

Bid records within a bids table 310 each relate to a bid received at the networked system 102 in connection with an auction-format listing supported by an auction application. A feedback table 312 is utilized by one or more reputation applications, in one example embodiment, to construct and maintain reputation information concerning users. A history table 314 maintains a history of transactions to which a user has been a party. One or more attributes tables 316 record attribute information pertaining to items for which records exist within the items table 304. Considering only a single example of such an attribute, the attributes tables 316 can indicate a currency attribute associated with a particular item, with the currency attribute identifying the currency of a price for the relevant item as specified by a seller.

Rate Limiter

In an online system providing access to resources, the rate of requests for those resources or the granting of those requests may be limited to prevent overuse or abuse by requesters. In some example embodiments, rate limiting involves restricting the number of requests an individual requester, or a group of requesters, may make in a given time period or restricting the number of approvals of such requests a system makes in a given time period.

Resource providers may provide a number of resources to resource consumers. In order to gain access to one or more of the resources, a resource consumer may send a request associated with one or more resources to the resource provider and the resource provider may be configured to respond to the request by providing the requested resource or enabling the requested resource to be provided to the consumer in servicing the request. For example, resource providers may provide access to facilities, services, documents, information, manufactured goods, raw materials, or electronic resources that may include electronic documents, web pages, bandwidth, electronic services (e.g., search services, database access, access to servers and server capabilities, application functionality, processing, etc.), among other things.

Providing consumers with access to resources may impact a resource provider's infrastructure. Each resource provided to a consumer may have an associated weight or cost on the provider's infrastructure. When multiple resources are requested and provided to multiple consumers, the weights or costs associated with the requests add up, and can thus lead to a decrease in overall system performance. For example, in the context of a network-based application platform such as a publishing platform or a marketplace platform, a resource consumer may submit a query request that requires a number of resources, such as some processing by a database server. The processing by the database server needed by the query may have certain associated costs that may be measured, for example, by the amount of time (e.g., processing time), memory, bandwidth, storage, or other computing resources. When a number of query requests and other requests require processing from the database server (e.g., record creation requests, record modification requests, record deletion requests, database management requests, etc.), the costs for a database server may approach or even exceed the database server's limits on its capabilities. Furthermore, responding to certain requests may impose different burdens on varying resources, and differing degrees of burden on the infrastructure than responding to other requests (e.g., querying a database may require substantially more processing than a webpage request). Overuse or abuse by a resource consumer may ultimately degrade the infrastructure's ability to serve other resource consumers.

To protect against overuse or abuse by resource consumers, the resource provider may impose limits on the rate at which a resource consumer may request a resource. In some example embodiments, a resource provider may limit the number of requests from a resource consumer.

Figure 4:
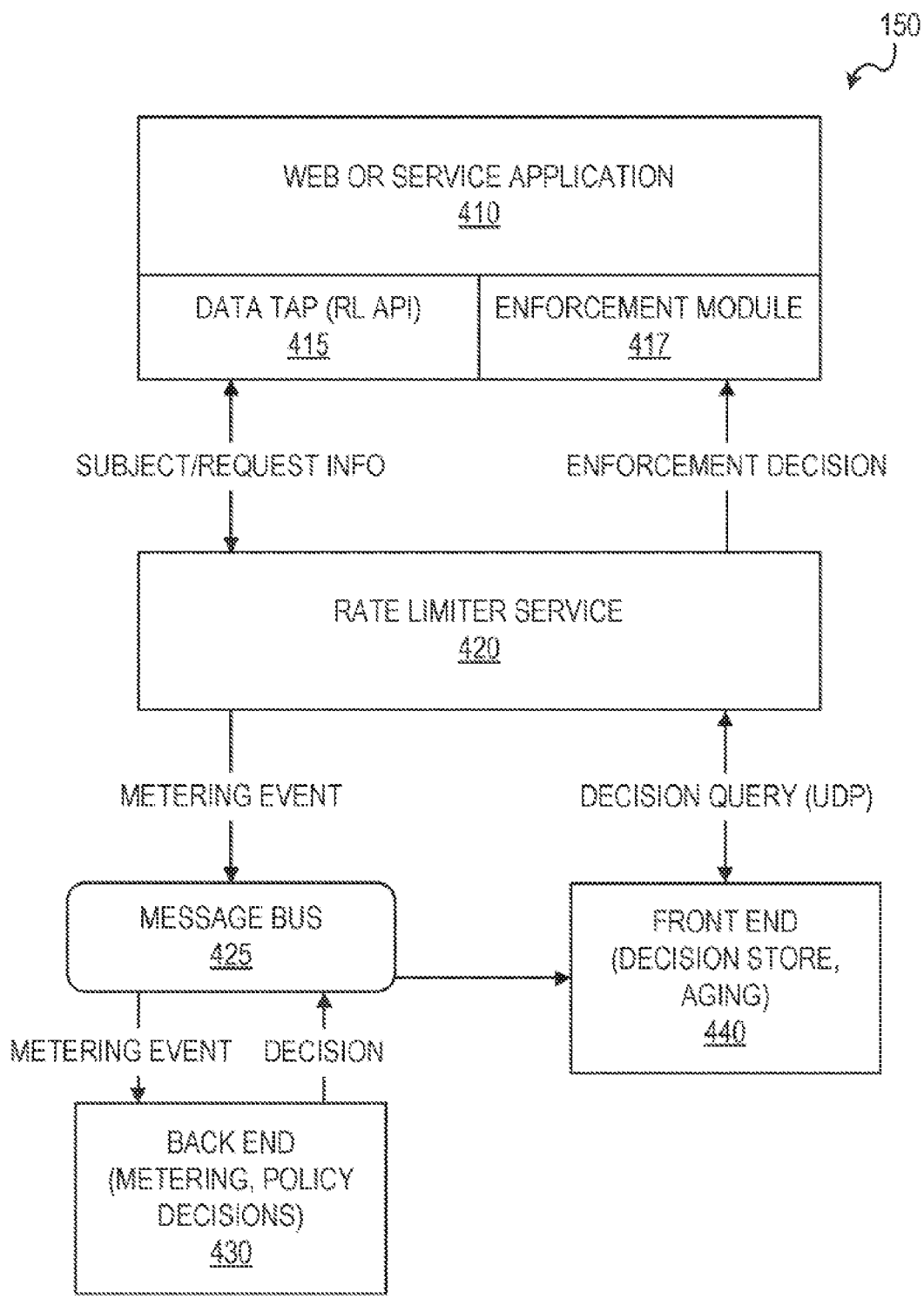
FIG. 4 is a block diagram illustrating a system architecture for a rate limiter system, in accordance with some example embodiments.
Figure 5:
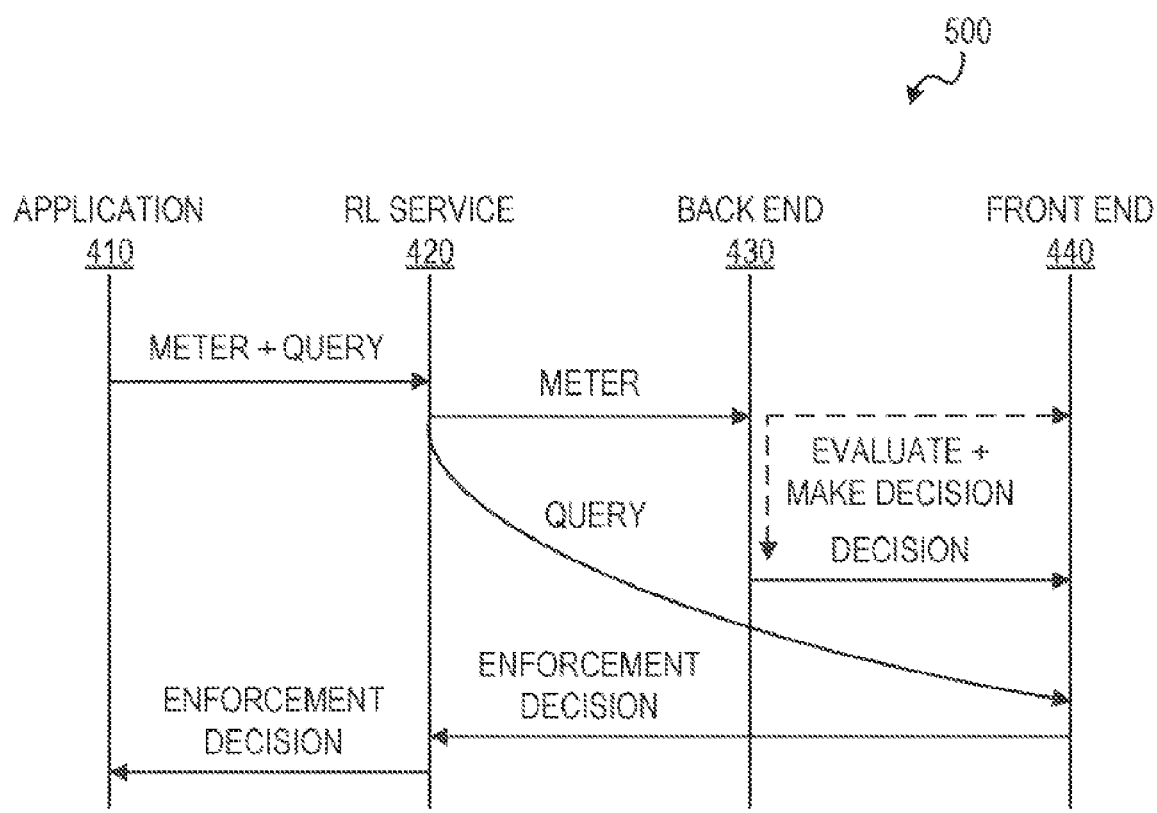
FIG. 5 is an event trace diagram showing rate limiting operations for the system architecture shown in FIG. 4, in accordance with some example embodiments.

As previously mentioned above, in some example embodiments, the rate limiter system 150 is configured to perform various rate limiting operations, as will be discussed in further detail below. In some example embodiments, these rate limiting operations comprise FIG. 4 is a block diagram illustrating a system architecture for the rate limiter system 150, in accordance with some example embodiments. In some example embodiments, the rate limiter system 150 comprises a web application or other online service application 410, a data tap 415, an enforcement module 417, a rate limiter service 420, a message bus 425, a back end system 430, and a front end system 440. These components of rate limiter system 150 can be communicatively coupled to each other in order to enable communications between them. FIG. 5 is an event trace diagram 500 showing rate limiting operations for the system architecture shown in FIG. 4, in accordance with some example embodiments.

In some example embodiments, referring to FIGS. 4 and 5, the web or service application 410 generates a request for one or more online resources (e.g., a request for information from the one or more online resources), and transmits the request to the rate limiter service 420. The application 410 can be triggered or otherwise caused to generate and transmit the request based on a corresponding request from one or more users 106 on a client device 110, such as a user 106 on a client device 110 requesting access to a service of the application 410. The application 410 can transmit the request to the rate limiter service 420 via the data tap 415, which can be an API of the rate limiter service 420. In some example embodiments, the data tap 415 is configured to characterize the request by identifying a subject of the request. For example, the data tap 415 can analyze the header and/or content of the request of the application 510 to determine what information, or what other kind of service, is being requested by the request of the application 410. The characterization can be based on one or more models for characterization. In some example embodiments, the application 410 or the data tap 414 includes this characterization information along with the corresponding request when the request is ultimately transmitted to the rate limiter service 420.

In some example embodiments, the request that is transmitted to the rate limiter service 420 comprises a metering event (or metering information) indicating the type of request, such as based on the characterization of the request, and a query for a decision on the request. The query can be configured to trigger or otherwise cause a response to the request, such as an enforcement decision (e.g., whether to grant access to a service of the application 410 or to deny access to the service).

In some example embodiments, the rate limiter service 420 transmits the metering event to the back end system 430, such as via the message bus 425. The back end system 430 evaluates the received metering event along with other information indicating a history of metering events in order to make an enforcement decision based on one or more policies or rules, such as by performing counting and thresholding operations. For example, the back end system 430 may store a rule limiting the number of requests that can be serviced by the application 410 within an hour to thirty or less. In this example, the application 410 has already serviced thirty requests in the last forty-five minutes and an incoming metering event is the thirty-first request. In such a scenario, the back end system 430 would count the incoming metering event and determine that this new request exceeds the threshold, as the maximum limit of thirty requests within an hour has already been reached. As a result, the back end system 430 issues a decision to deny the request. This decision can be transmitted from the back end system 430 to the front end system 440, where this decision state can be stored for later access.

It is contemplated that other types of enforcement policies or rules are within the scope of the present disclosure. Examples of other types of enforcement policies or rules that can be employed within the scope of the present disclosure include, but are not limited to, enforcement rules or policies based on a maximum limit of a type of request that can be serviced or received within a predetermined period of time or other time restriction, a maximum limit of requests or types of requests associated with an IP address that can be serviced or received within a predetermined period of time or other time restriction (e.g., after one-hundred sign-ins for an application from a single IP address, block that IP address for twenty-four hours), a maximum limit of requests or types of requests associated with a particular mobile device that can be serviced or received within a predetermined period of time or other time restriction (e.g., after one-hundred sign-ins for an application from a single mobile device, block that mobile device for twenty-four hours), a list of IP addresses from which requests are to be serviced, a list of IP addresses from which requests are to be denied, a list of mobile devices from which requests are to be serviced, and a list of mobile devices from which requests are to be denied.

In some example embodiments, the front end system 440 stores a plurality of currently active enforcement decisions for the application 410. For example, based on a determination by the back end system 430 that the maximum limit of requests serviced within an hour has been reached, the front end system 440 can store an enforcement decision made by the back end system 430 to deny all other requests for the remainder of the hour. Then, when the rate limiter service 420 submits the query for the request to the front end system 440, the front end system 440 access the stored enforcement decision that corresponds to the query, and returns that enforcement decision to the rate limiter service 420. In some example embodiments, the rate limiter service 420 and the front end system 440 communicate using the User Datagram Protocol (UDP). The rate limiter service 420 transmits the enforcement decision to the application 410, and the application 410 can then enforce the enforcement decision, such as by granting or denying the request from the client device 110.

In some example embodiments, the rate limiter service 420 transmits the enforcement decision to the enforcement module 417. The enforcement module 417 is configured to interpret the enforcement decisions from the rate limiter service 420 and to implement, effectuate, or otherwise enforce those enforcement decisions. For example, if the rate limiter service 420 returns an enforcement decision to block a subject for a specified period of time, the enforcement module 417 may return an error stating that the subject is blocked in response to the subject submitting a request during that specified period of time. In one example embodiment, the enforcement module 417 ensures that the application 410 aborts the flow of a current HTTP request call, returning an HTTP 429 status code. The enforcement module 417 may interact with other parts of the application 410 in order to implement, effectuate, or otherwise enforce enforcement decisions. In some example embodiments, the enforcement decisions are transmitted from the rate limiter service 420 to the data tap 415, which then transmits the enforcement decisions to the enforcement module 417. In other example embodiments, the enforcement decisions are transmitted from the rate limiter service 420 to the enforcement module 417 without passing through the data tap 415.

In some example embodiments, the back end system 430 receives and counts metering events, but can wait to transmit an enforcement decision to the front end system 440 until a particular condition is satisfied, such as a particular threshold being reached or exceeded. In some example embodiments, the determining of the enforcement decision by the back end system 430 and the transmitting of the enforcement decision from back end system 430 to the front end system 440 can be performed asynchronously with the transmitting of the request from the application 410. In this respect, the determining of the enforcement decision by the back end system 430 and the transmitting of the enforcement decision from back end system 430 to the front end system 440 can be performed independently of the transmitting of the request from the application 410. In some example embodiments, the back end system 430 receives and counts metering events from multiple applications 410 and/or multiple other types of sources (e.g., from different systems). This receiving and counting from different sources can be performed at different times, such that the back end system 430 can perform an overall accounting of the requests from different sources and asynchronously make enforcement decisions that can then be stored in the front end system 440 for subsequent access by the rate limiter service 420.

Figure 6:
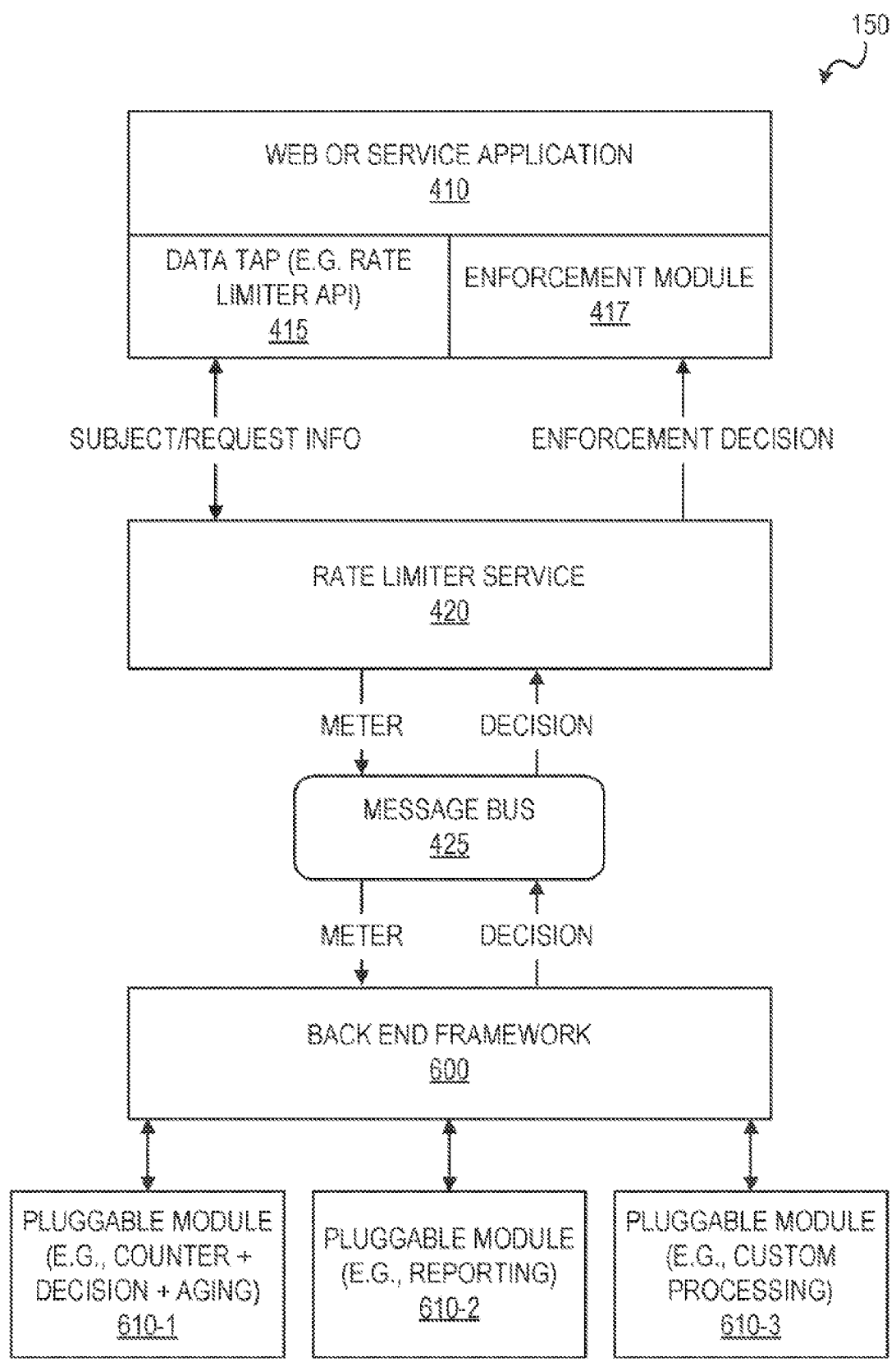
FIG. 6 is a block diagram illustrating another system architecture for a rate limiter system, in accordance with some example embodiments.
Figure 7:
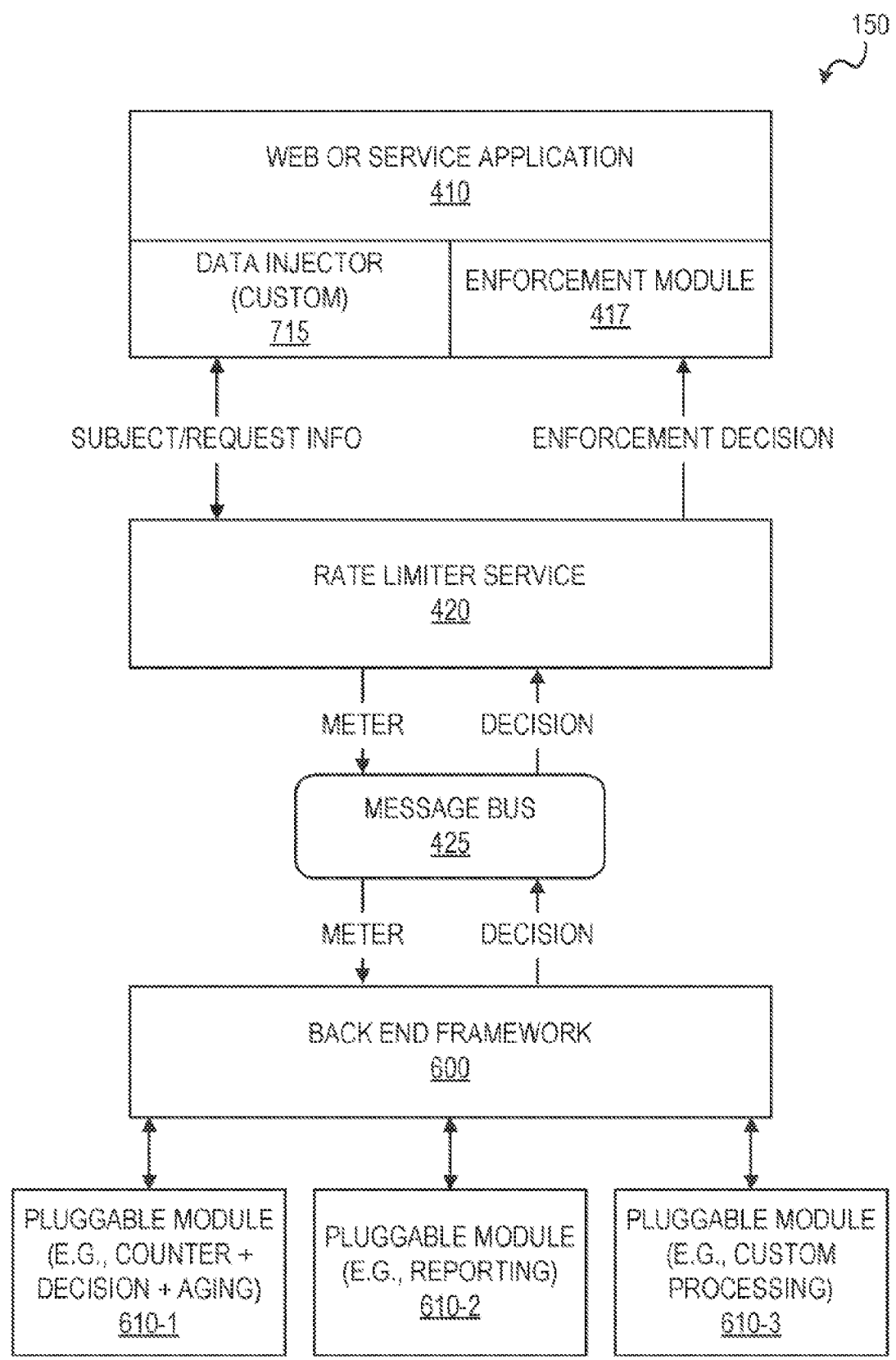
FIG. 7 is a block diagram illustrating yet another system architecture for a rate limiter system, in accordance with some example embodiments.
Figure 8:
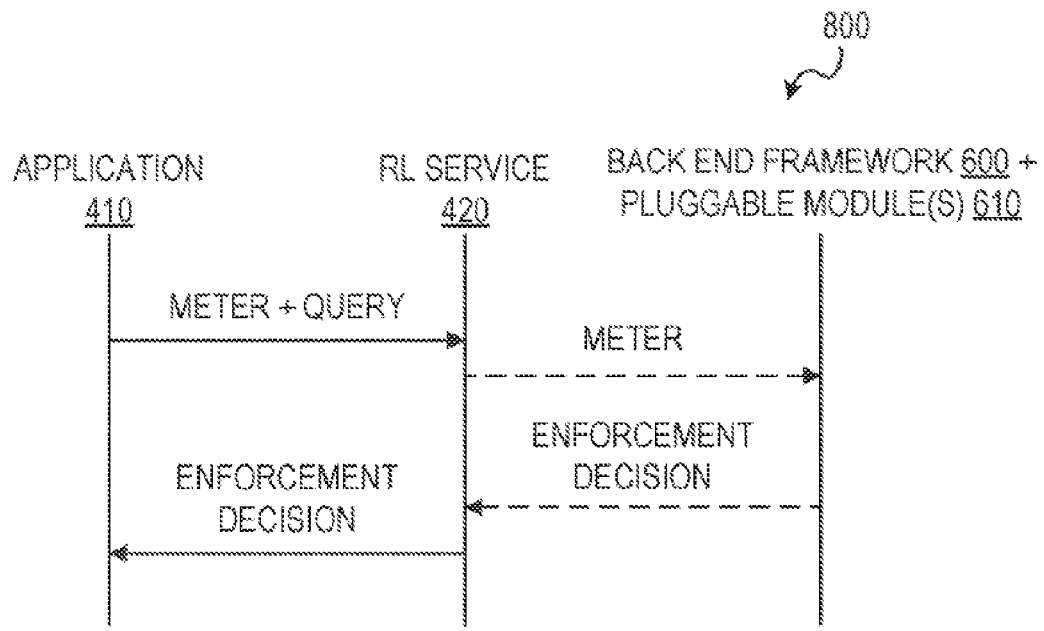
FIG. 8 is an event trace diagram showing rate limiting operations for the system architecture shown in FIG. 6, in accordance with some example embodiments.

FIG. 6 is a block diagram illustrating another system architecture for the rate limiter system 150, in accordance with some example embodiments. The rate limiter system 150 in FIG. 6 is similar to the rate limiter system 150 in FIG. 4. FIG. 8 is an event trace diagram 800 showing rate limiting operations for the system architecture shown in FIGS. 6 and 7, in accordance with some example embodiments. However, in the example embodiment of FIG. 6, instead of the rate limiter system 150 storing the enforcement decisions in the front end system 440, the rate limiter service 420 retrieves and stores the enforcement decisions from a back end framework 600. The back end framework 600 may comprise the back end system 430 configured to perform the counting and thresholding operation with respect to the metering events of the requests originating from the application 410. The back end framework 600 can determine enforcement decisions based on the application of one or more stored policies or rules. In some example embodiments, the rate limiter service 420 accesses, retrieves, or otherwise receives the enforcement decisions from the back end framework asynchronously from or otherwise independent of receiving a request from the application 410. In response to receiving a query from the application 410, the rate limiter service 420 accesses its stored enforcement decision and transmits that enforcement decision to the application 410, without having to take time to communicate with the back end system 430. As a result of moving the storage of the enforcement decisions closer to the application 410, the example embodiment of the rate limiter system 150 shown in FIG. 6 significantly improves the responsiveness of the rate limiter system 150, making the lookup/response time much faster.

Additionally, the example embodiment shown in FIG. 6 also introduces one or more pluggable modules 610. Although the back end framework 600 can already have an existing policy database storing policies used for determining the enforcement decisions, in example embodiment shown in FIG. 6, different users can provide their own policies or rules via different pluggable modules 610. For example, one pluggable module 610-1 can be configured to provide and enforce rules for preventing fraud (e.g., too many requests from the same IP address or mobile device within a predetermined period of time), while another pluggable module 610-2 can be configured to provide and enforce rules for reporting service requests for accounting purposes, while yet another pluggable module 610-3 can be configured to provide and enforce rules for throttling purposes to prevent overloading. Furthermore, the same user can provide different policies or rules for different scenarios or applications. For example, a first user can plug in pluggable module 610-1 to the back end framework 600 (e.g., to count certain types of requests for fraud detection purposes), a second user can plug in pluggable module 610-2 to the back end framework 600 (e.g., to count certain types of requests for accounting and reporting purposes), and a third user can plug in pluggable module 610-3 to the back end framework 600 (e.g., to count certain types of requests for throttling purposes). Additionally, a first user can plug in pluggable modules 610-1, 610-2, and 610-3 for different purposes. The pluggable nature of the back end framework 600 improves the flexibility of the rate limiter system 150, which helps protect against fraudsters who can adapt to certain rate limiting policies or rules over time.

This flexibility can also be extended to the data tap 615. FIG. 7 is a block diagram illustrating yet another system architecture for the rate limiter system 150, in accordance with some example embodiments, where the data tap from FIGS. 4 and 6 has been replaced with a custom data injector 715. In some example embodiments, the data injector 715 is configured to enable users to customize and update the characterization of requests, providing more flexibility for characterization of subject types or classification. In this respect, the data injector 715 acts as an extensible data tap. Any new classification can be added using the data injector 715. A user can author and input a model of known classifiers and known subjects, and then author and input rules against that model. In some example embodiments, the enforcement decisions are transmitted from the rate limiter service 420 to the data injector 715, which then transmits the enforcement decisions to the enforcement module 417. In other example embodiments, the enforcement decisions are transmitted from the rate limiter service 420 to the enforcement module 417 without passing through the data injector 715.

Figure 9:
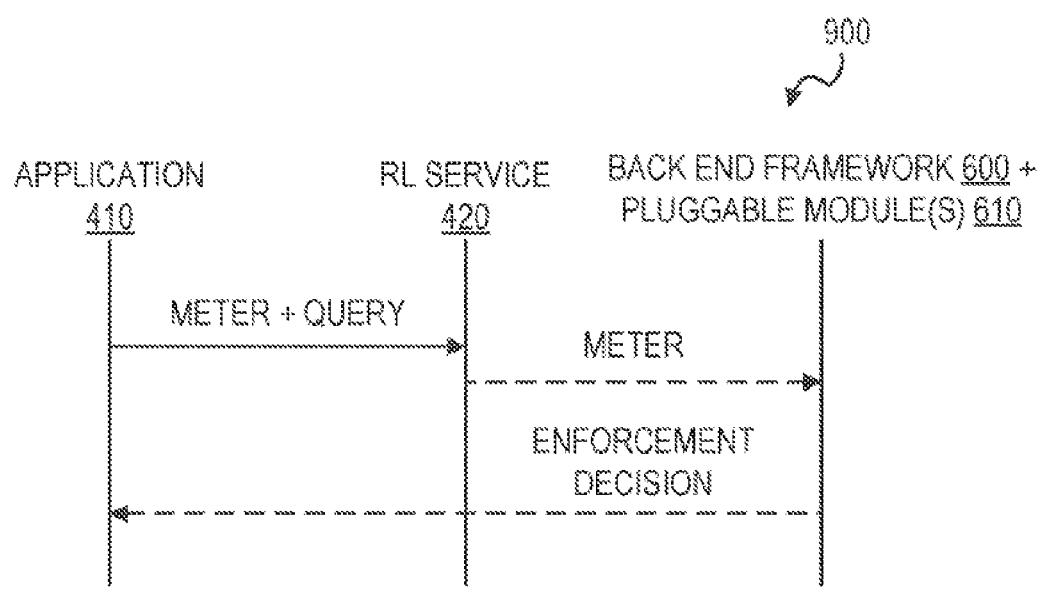
FIG. 9 is an event trace diagram showing rate limiting operations for the system architecture shown in FIG. 7, in accordance with some example embodiments.

In some example embodiments, the storage of the enforcement decisions is moved to the application 410 itself, thereby making the response time even quicker. FIG. 9 is an event trace diagram 900 showing rate limiting operations for the system architectures shown in FIGS. 6 and 7, in accordance with some example embodiments. In FIG. 9, the rate limiter service 420 receives the metering event and query of the request from the application. Metering events are transmitted to the back end framework 600 for processing by one or more of the pluggable modules 610. The back end framework 600 transmits enforcement decisions, based on the processing of the one or more pluggable modules 610, to the application 410. In some example embodiments, the enforcement decisions are transmitted to the application 410 asynchronously from, or otherwise independent of, any requests from the application 410. As a result of the application 410 storing the enforcement decisions itself, instead of having to retrieve the enforcement decisions from the rate limiter service 420 or the front end system 440, the rate limiter system 150 is able to achieve a significant reduction in response time with respect to the request from the client device 110.

Additionally, in some example embodiments, the rate limiter system 150 also provides an open loop architecture that enables different users or systems to plug into the rate limiter service 420 and/or the back end framework 430. For example, other systems or online services can use the metering information and/or the enforcement decisions stored in the rate limiter system 150 for their own purposes, such that the request is received by the rate limiter service 420 via application 410, but the enforcement decision and the information used to make the enforcement decision (e.g., the counting of metering events) is provided to one or more other applications in addition to application 410 or instead of to application 410 (e.g., application 410 does not receive and/or use the enforcement decision to limit service).

Furthermore, in some example embodiments, the rate limiter system 150 is configured to enable different sources of requests to be plugged in in order for the rate limiting service 420 and/or the back end framework 600 to process the requests, and then report the metering information and/or enforcement decisions back to the corresponding source. It is contemplated that different teams within the same organization can plug in their own data and their own custom policy processing (e.g., via pluggable modules 610), thereby enabling the different teams to utilize the capabilities of the rate limiter system 150 for different purposes and functions.

Figure 10:
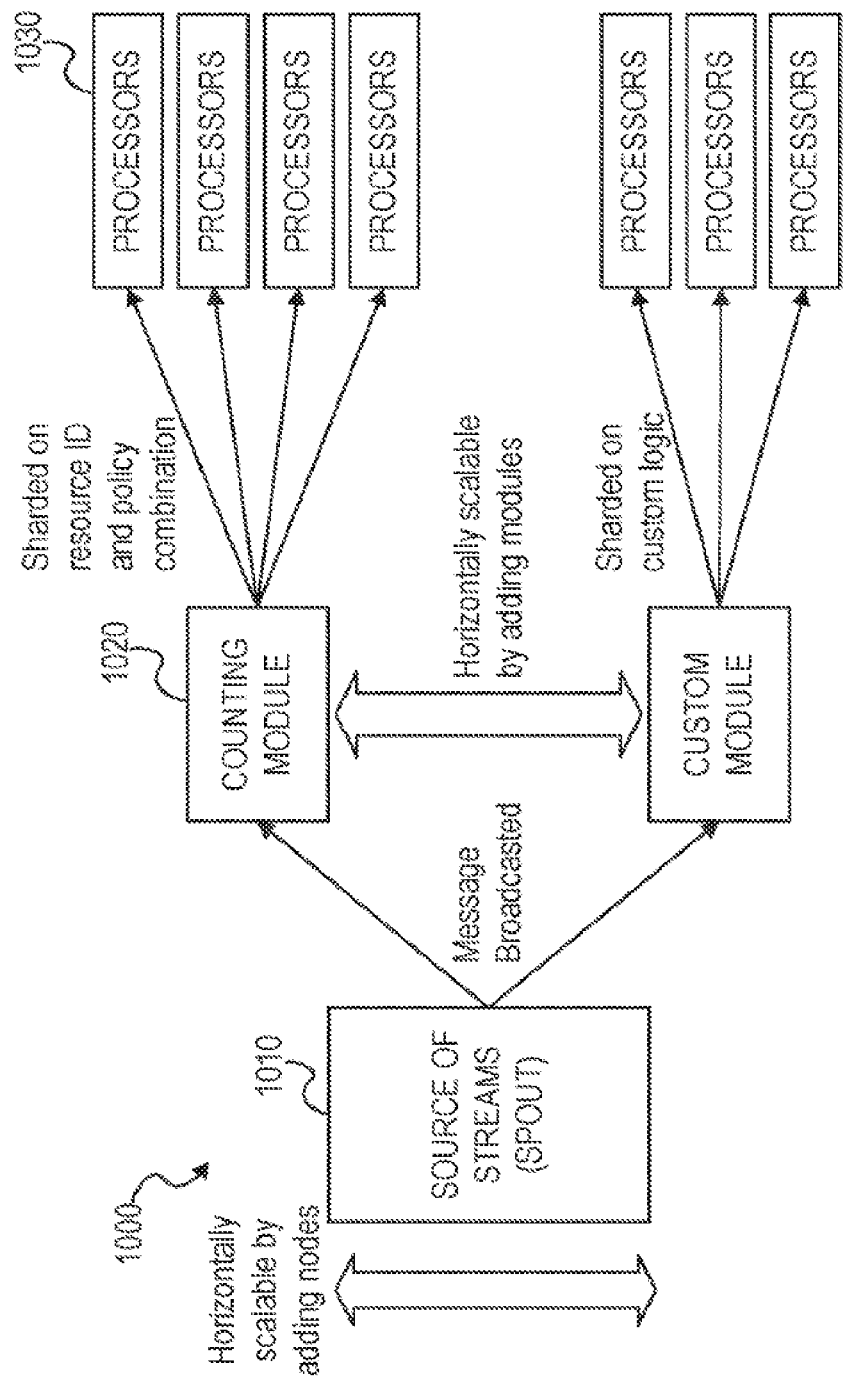
FIG. 10 illustrates scalability features that can be implemented in a distributed real-time computation system with pluggable modules, in accordance with some example embodiments.

FIG. 10 illustrates scalability features that can be implemented in a distributed real-time computation system 1000 with pluggable modules, such as pluggable modules 610, in accordance with some example embodiments. In FIG. 10, it is shown how to scale an entire event transmission system that incorporates the rate limiting features disclosed herein. In some example embodiments, the system 1000 is implemented based on Apache Storm. However, other types of distributed real-time computation systems are also within the scope of the present disclosure. The system 1000 comprises a source of streams 1010. In Apache Storm, such a source of streams can be referred to as a "spout." A spout is a type of event distributor that acts as a source of streams (e.g., unbounded sequences of tuples) in a topology. Generally, spouts will read tuples from an external source and emit them into the topology. The streams are broadcast to processing modules 1020. In Apache Storm, these processing modules 1020 can be referred to as "bolts." A bolt may be configured to perform any processing operation, including, but not limited to, stream transformation, filtering, functions, aggregations, joins, and talking to databases. In some example embodiments, the spouts and bolts are parallelized as tasks that get scheduled onto a cluster of nodes or processors (or workers) 1030, which may comprise compute instances such as virtual machines. In some example embodiments, the spout 1010 is horizontally scalable by adding nodes, the processing modules 1020 are horizontally scalable by the architecture, and individual module logic run on processors 1030 are horizontally scalable by custom sharding.

Figure 11:
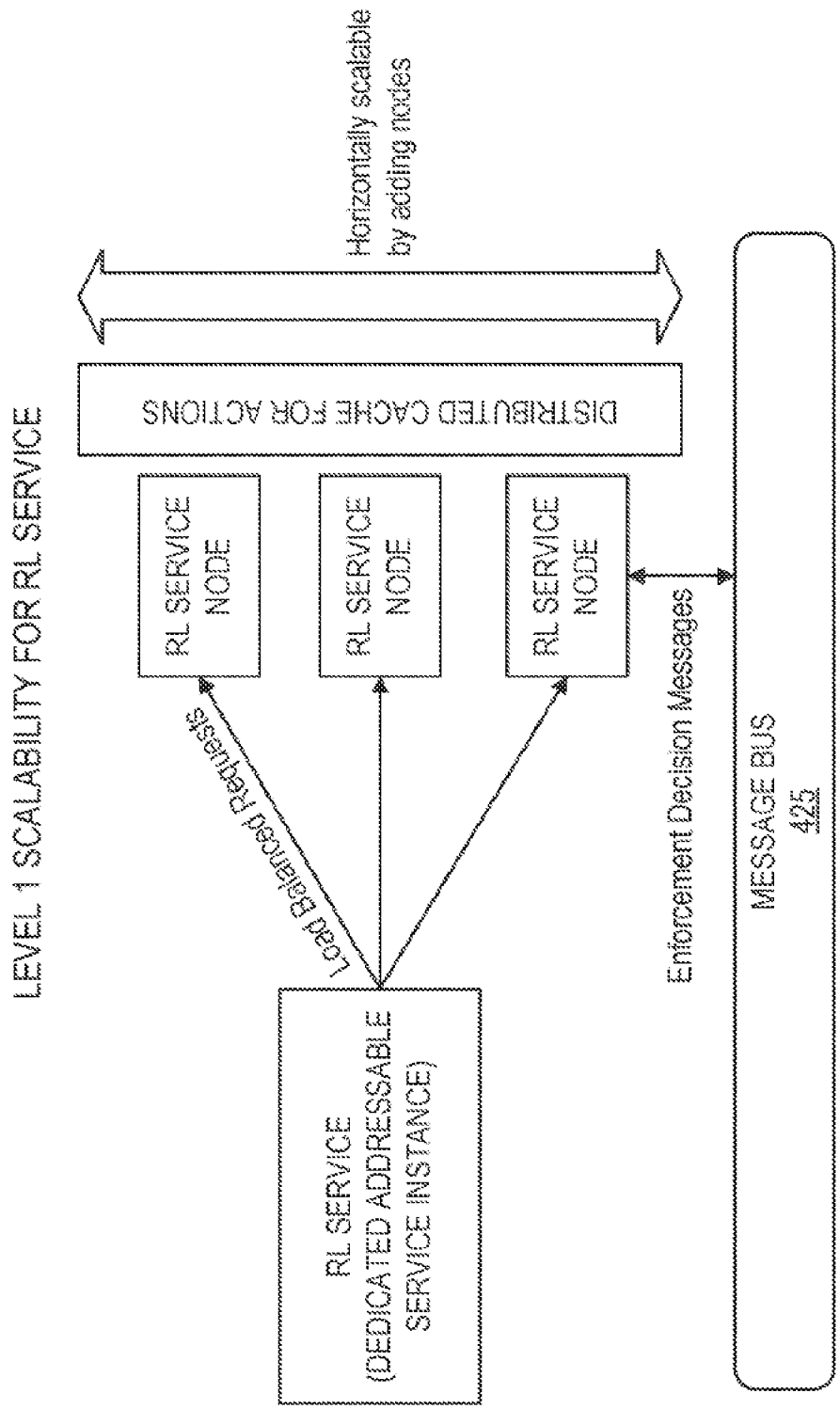
FIG. 11 illustrates scalability features that can be implemented for a rate limiter service, in accordance with some example embodiments.

FIG. 11 illustrates scalability features that can be implemented for a rate limiter service 420, in accordance with some example embodiments. In some example embodiments, the rate limiter service 420 is implemented as a compute cluster. In some example embodiments, a first level of horizontal scalability is implemented from the various nodes under the rate limiter service. In some example embodiments, the distributed cache implements a ceiling on how much a single instance of rate limiter service can scale horizontally. In order to enable the whole cluster of instances to collectively hold the decision store of enforcement decisions, a scheme may be implemented where different participating members of the cluster can collectively share this state. In some example embodiments, such as the example embodiment shown in FIG. 11, a read-write cache accessible to all of the instances may be employed.

Figure 12:
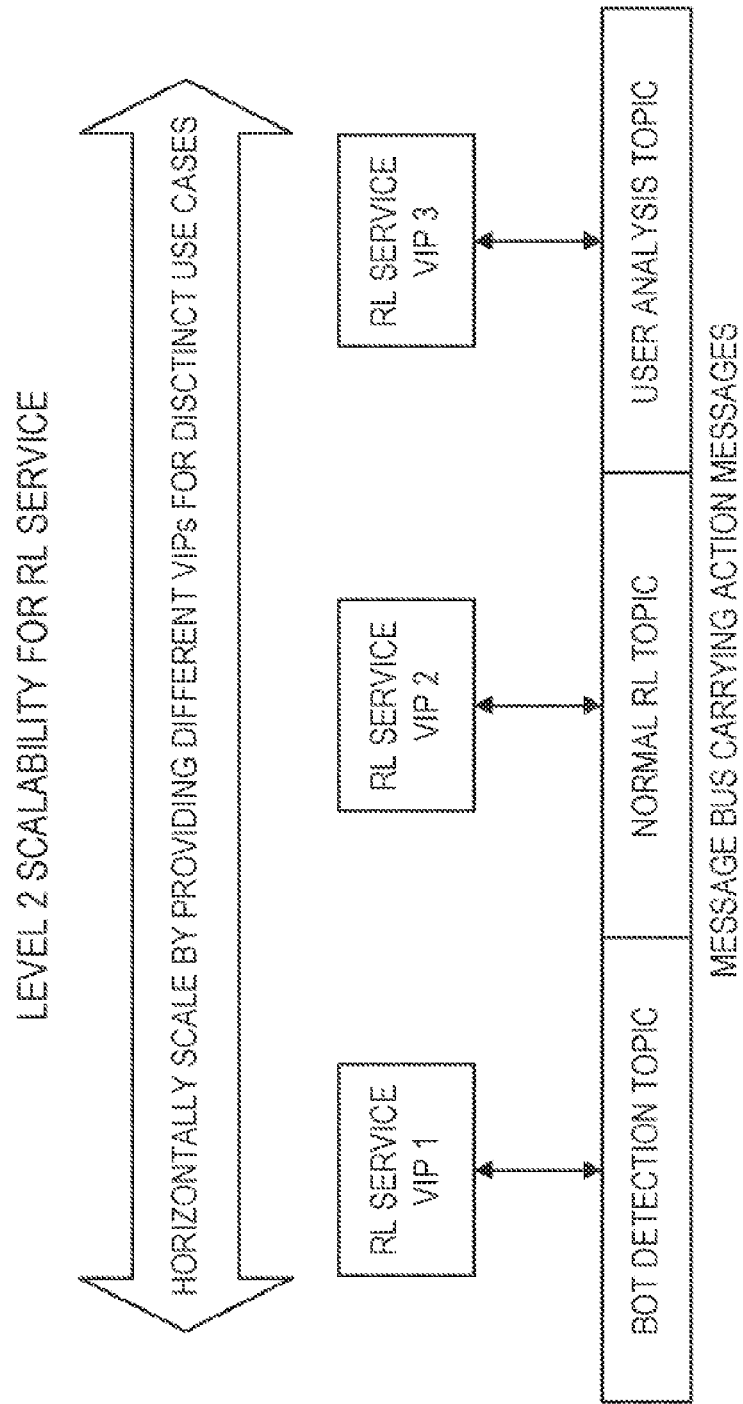
FIG. 12 illustrates scalability features that can be implemented for a rate limiter service, in accordance with some example embodiments.

However, the read-write cache may have some size limitations beyond which the rate limiter service 420 cannot be scaled in this way. The example embodiment shown in FIG. 12 addresses these potential scalability limitations. FIG. 12 illustrates scalability features that can be implemented for a rate limiter service 420, in accordance with some example embodiments. In some example embodiments, different rate limiter services 420 oriented to different use cases are operated. In some example embodiments, logically sharded use cases can be served by different instances of the rate limiter service acting on the same message bus. The different rate limiter services 420 may be independently addressed as separate addressable dedicated service instances, which are then configured into the client application 410 on a per-use case basis.

Figure 13:
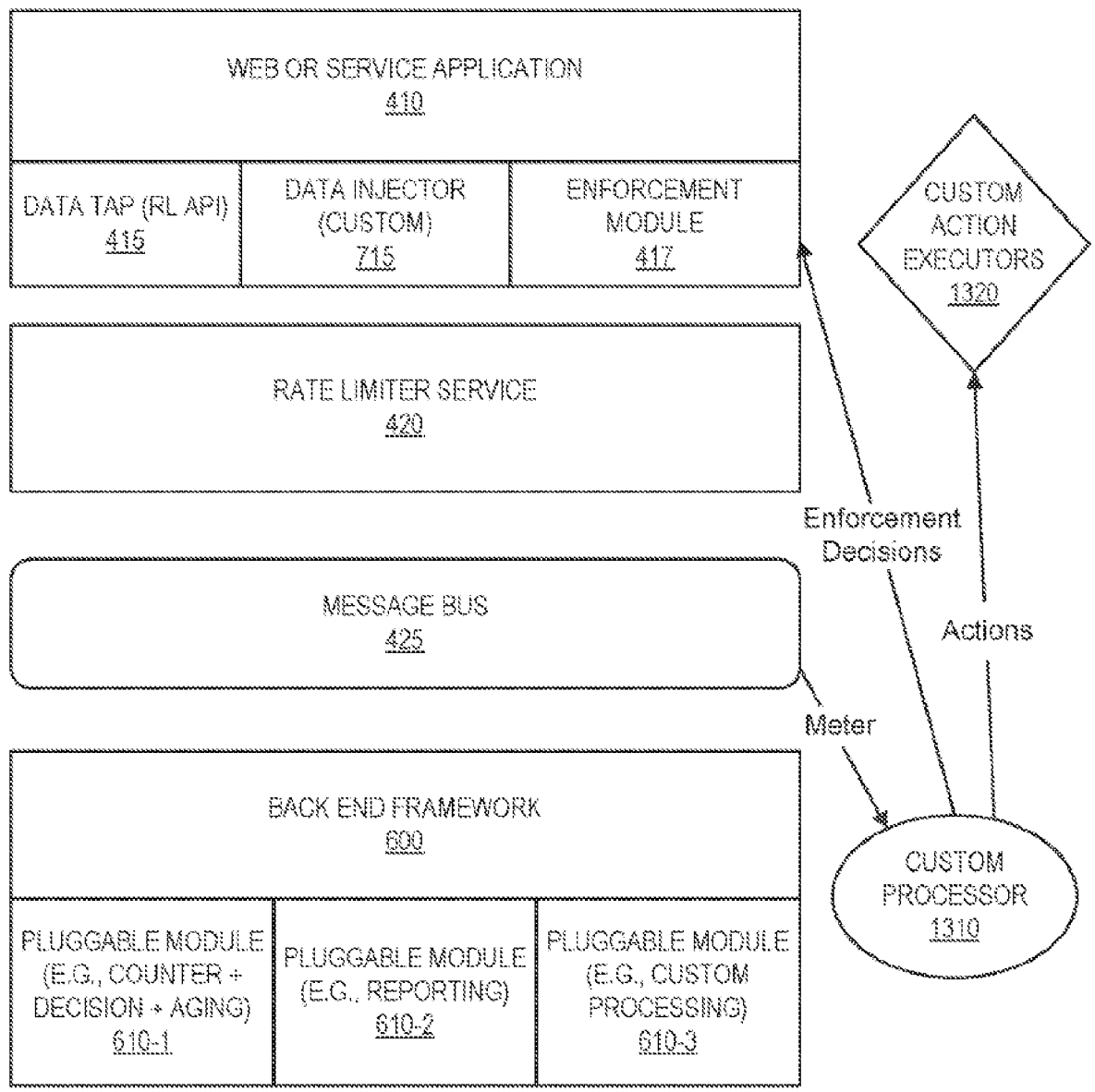
FIG. 13 illustrates features of the system architecture, in accordance with some example embodiments.

FIG. 13 illustrates features of the system architecture for rate limiter system 150, in accordance with some example embodiments. This system architecture relates to the open loop capability features of the present disclosure. In some example embodiments, custom actions can be taken that are not specifically implemented within the enforcement module 417. FIG. 13 shows this open loop nature of the system, in which, based on the message bus alone, events can be produced or consumed by any business software that is able to talk to the message bus (e.g., Apache Kafka). The extension points may include one or more custom processors 1310 and one or more custom action executors 1320.

In some example embodiments, the custom processor 1310 comprises a rule engine, or the like, operated by another business unit, not designed in the rate limiter architecture as such, but which wants to consume data tap or data injector derived events, and do something like flag suspicious usage. The custom processor 1310 may receive event information, such as a metering event, from the message bus 425. The custom processor 1310 can generate enforcement decisions based on the event information and transmit the enforcement decisions to the enforcement module 417. Additionally or alternatively, the custom processor 1310 can generate other actions based on the event information and transmit the actions to the custom action executors 1320. The custom processor 1310 may act as a continuous consumer of events, but may or may not be a producer depending on whether its work flows back into the rate limiter architecture or whether its work flows to external components.

In some example embodiments where a custom action executor 1320 is employed, an enforcement event appears on the bus and is consumed by the action executor 1320, which takes some enforcement action in addition to, or instead of, what is usually implemented in the enforcement module 417. The custom processor 1310 and custom action executor 1320 do not need to, and often may not, run in the same process or compute instance (e.g., virtual machine) as the application 410, since these extension points are just interfacing on the message bus 425 and therefore can execute anywhere within connectivity of that bus.

In some example embodiments, the data injector 715 is configured to inject any data from the application 410 into the rate limiter service 420. One or more custom pluggable modules 610 can be added for processing messages from the message bus 425. In some example embodiments, one or more custom processors are implemented and reside outside the distributed real-time computation system and can also process messages from the message bus 425. In some example embodiments, the custom action executors 1320 are configured to wait for certain action messages to act by modifying some external system.

Figure 14:
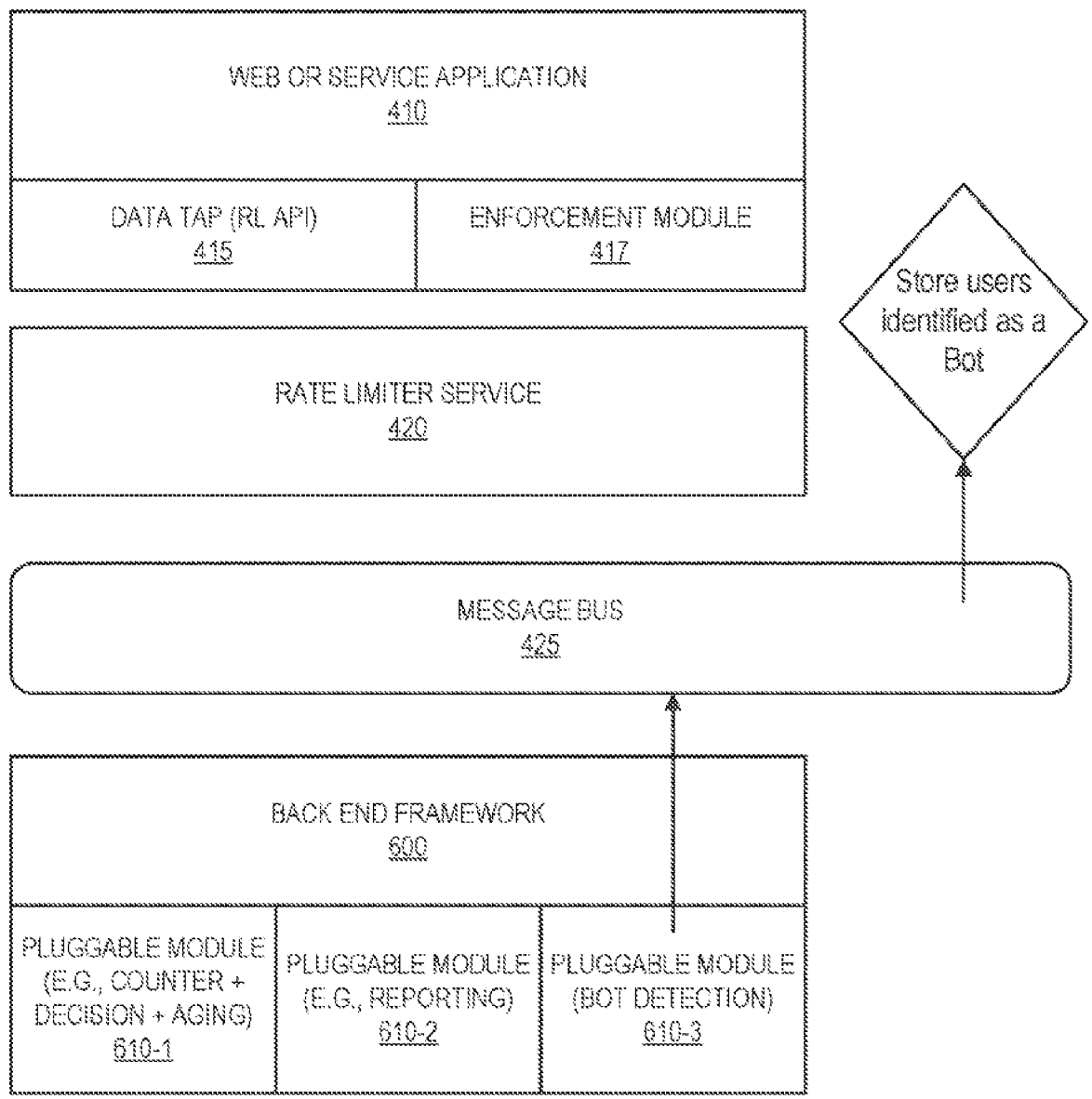
FIG. 14 illustrates features of the system architecture, in accordance with some example embodiments.

FIG. 14 illustrates features of the system architecture for rate limiter system 150, in accordance with some example embodiments. FIG. 14 illustrates an example embodiment, related to FIG. 13, in which the custom action executor performs an action to store users that are identified as a Bot (e.g., in a database table or other non-rate limiter part of a system implementation). The diagram shows this execution paired with a custom pluggable module 610-3 within the rate limiter architecture, so that it is part of the rate limiter back end cluster. In some example embodiments, this custom logic also operates more at arm's length as a custom processor, so that it runs separately from the back end and acts as another consumer on the message bus.

In some example embodiments, the custom pluggable module 610-3 analyzes a request to identify or otherwise detect an automated Bot (e.g., Internet Bot) access that uses one or more user accounts. When a Bot is identified, the user account is messaged via an action message to the message bus. This action message is picked up by a component of the system that is used to store users detected as a Bot. In some example embodiments, the rate limiter service 420 or the application 410 picks up this action message and store the users detected as a Bot. In some example embodiments, the application 410 or other applications call the component storing the users detected as a Bot in order to identify Bot users. For example, the application 410 can call the component to determine whether a particular user has been identified as a Bot.

Figure 15:
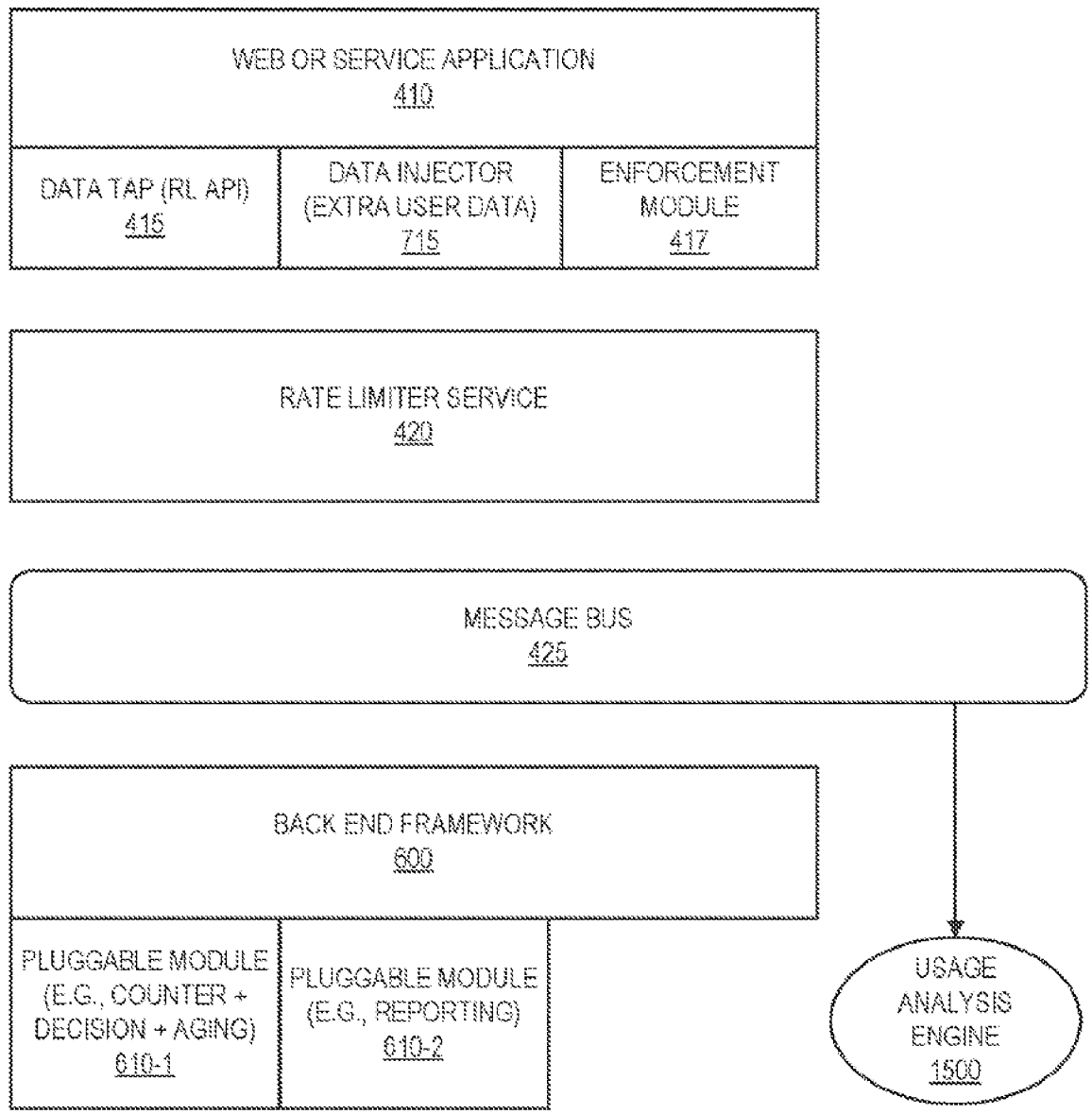
FIG. 15 illustrates features of the system architecture, in accordance with some example embodiments.

FIG. 15 illustrates features of the system architecture for rate limiter system 150, in accordance with some example embodiments. FIG. 15 shows an embodiment with a custom processor—a usage analysis engine that stores data to some other analytics system or database within an online system. Here, there is no enforcement or open loop action performed by any component, neither by an enforcement module nor by a custom action executor. In FIG. 15, the data injector 715 adds extra data regarding user behavior. This extra data gets pushed into the message bus 425. This extra data, along with other user data, is piped into a usage analysis engine 1500. The usage analysis engine 1500 can perform a variety of different functions using this extra data. In some example embodiments, the usage analysis engine 1500 performs one or more behavior prediction functions using this extra data, such as by employing predictive analytics on the user behavior data.

It is contemplated that any features of any embodiments disclosed herein can be combined with any other features of any other embodiments disclosed herein. Accordingly, these any such hybrid embodiments are within the scope of the present disclosure.

Figure 16:
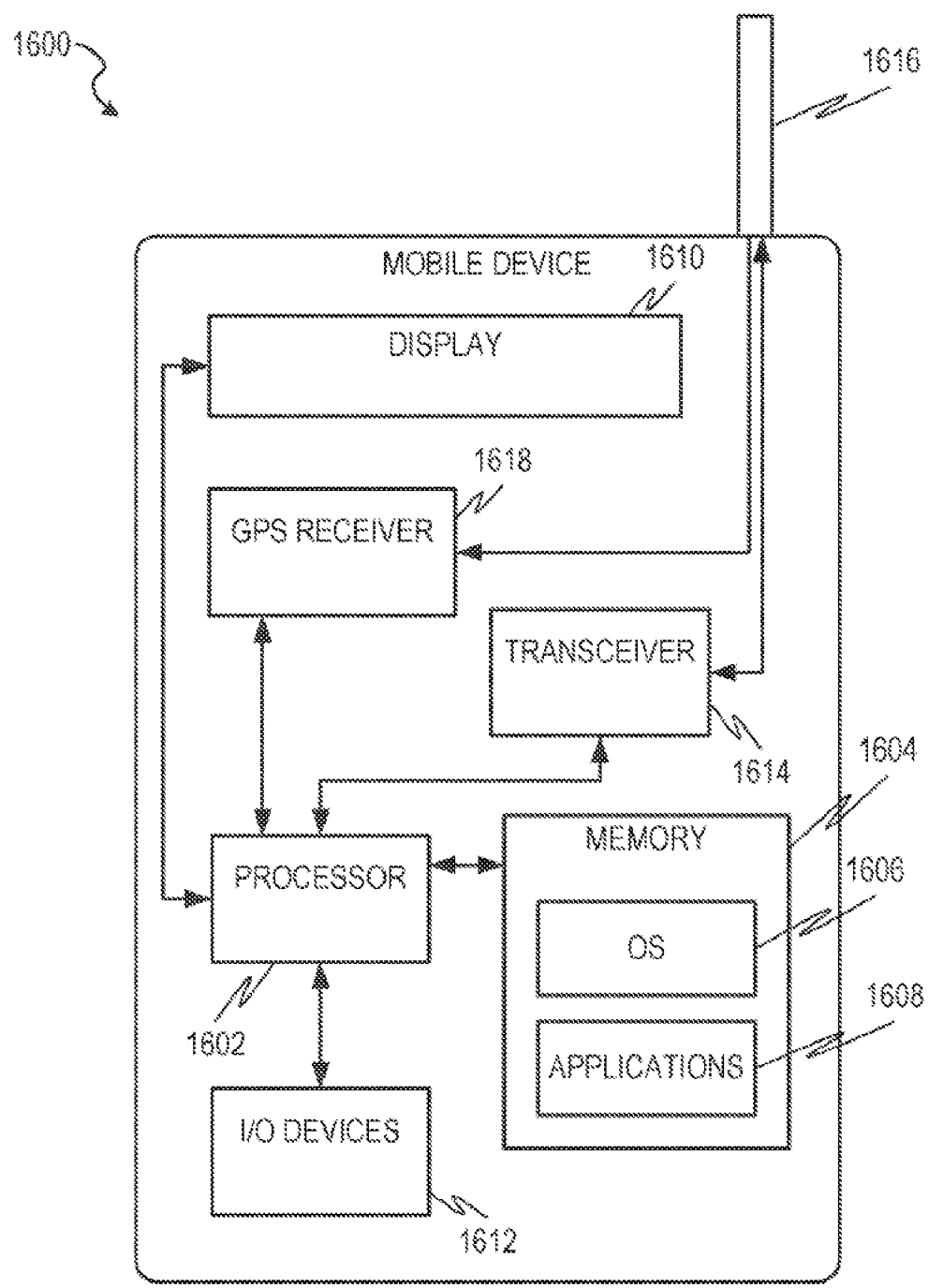
FIG. 16 is a block diagram illustrating a mobile device, in accordance with some example embodiments.

FIG. 16 is a block diagram illustrating a mobile device 1600, in accordance with some example embodiments. The mobile device 1600 can include a processor 1602. The processor 1602 can be any of a variety of different types of commercially available processors suitable for mobile devices 1600 (for example, an XScale architecture microprocessor, a Microprocessor without Interlocked Pipeline Stages (MIPS) architecture processor, or another type of processor). A memory 1604, such as a random access memory (RAM), a Flash memory, or other type of memory, is typically accessible to the processor 1602. The memory 1604 can be adapted to store an operating system (OS) 1606, as well as application programs 1608, such as a mobile location enabled application that can provide LBSs to a user. The processor 1602 can be coupled, either directly or via appropriate intermediary hardware, to a display 1610 and to one or more input/output (I/O) devices 1612, such as a keypad, a touch panel sensor, a microphone, and the like. Similarly, in some example embodiments, the processor 1602 can be coupled to a transceiver 1614 that interfaces with an antenna 1616. The transceiver 1614 can be configured to both transmit and receive cellular network signals, wireless data signals, or other types of signals via the antenna 1616, depending on the nature of the mobile device 1600. Further, in some configurations, a GPS receiver 1618 can also make use of the antenna 1616 to receive GPS signals.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner In various example embodiments, one or more computer systems (e.g., a standalone computer system, a client computer system, or a server computer system) or one or more hardware modules of a computer system (e.g., a processor or a group of processors)

may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

The modules, methods, applications and so forth described in conjunction with FIGS. 4-15 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the features of the present disclosure in different contexts from the disclosure contained herein.

Figure 17:
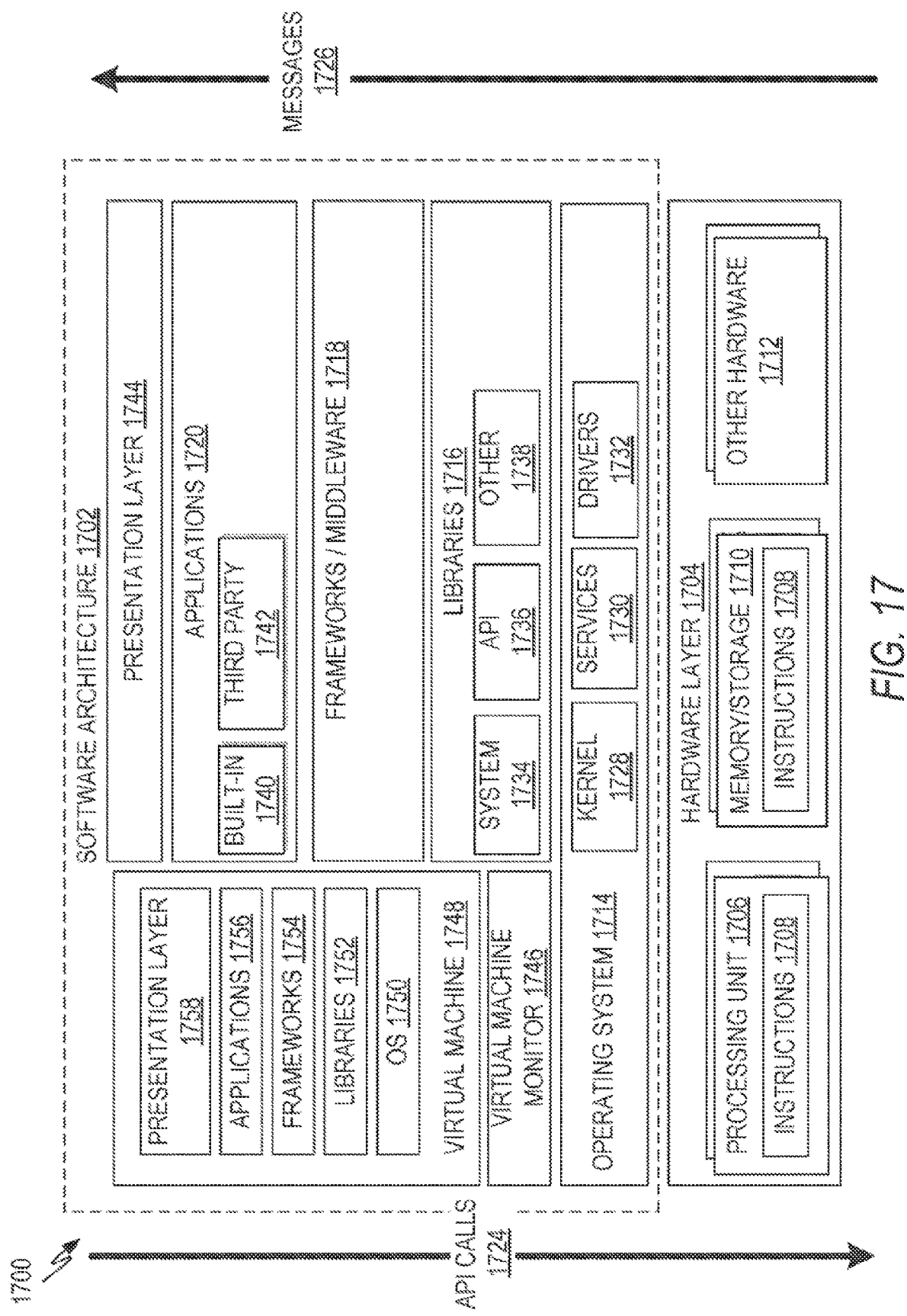
FIG. 17 is a block diagram illustrating a representative software architecture, in accordance with some example embodiments.

FIG. 17 is a block diagram 1700 illustrating a representative software architecture 1702, which may be used in conjunction with various hardware architectures herein described. FIG. 17 is merely a non-limiting example of a software architecture 1702 and it will be appreciated that many other architectures may be implemented to facilitate the functionality described herein. The software architecture 1702 may be executing on hardware such as a machine 1600 of FIG. 16 that includes, among other things, processors 1610, memory/storage 1630, and I/O components 1650. A representative hardware layer 1704 is illustrated in FIG. 17 and can represent, for example, the machine 1600 of FIG. 16. The representative hardware layer 1704 comprises one or more processing units 1706 having associated executable instructions 1708. The executable instructions 1708 represent the executable instructions of the software architecture

1702, including implementation of the methods, modules, and so forth of FIGS. 4-15. The hardware layer 1704 also includes memory and/or storage modules 1710, which also have the executable instructions 1708. The hardware layer 1704 may also comprise other hardware 1712, which represents any other hardware of the hardware layer 1704, such as the other hardware illustrated as part of the machine 1600.

In the example architecture of FIG. 17, the software architecture 1702 may be conceptualized as a stack of layers where each layer provides particular functionality. For example, the software architecture 1702 may include layers such as an operating system 1714, libraries 1716, frameworks/middleware 1718, applications 1720, and a presentation layer 1744. Operationally, the applications 1720 and/or other components within the layers may invoke application programming interface (API) calls 1724 through the software stack and receive a response, returned values, and so forth, illustrated as messages 1726, in response to the API calls 1724. The layers illustrated are representative in nature and not all software architectures have all layers. For example, some mobile or special purpose operating systems may not provide a frameworks/middleware 1718, while others may provide such a layer. Other software architectures may include additional or different layers.

The operating system 1714 may manage hardware resources and provide common services. The operating system 1714 may include, for example, a kernel 1728, services 1730, and drivers 1732. The kernel 1728 may act as an abstraction layer between the hardware and the other software layers. For example, the kernel 1728 may be responsible for memory management, processor management (e.g., scheduling), component management, networking, security settings, and so on. The services 1730 may provide other common services for the other software layers. The drivers 1732 may be responsible for controlling or interfacing with the underlying hardware. For instance, the drivers 1732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1716 may provide a common infrastructure that may be utilized by the applications 1720 or other components or layers. The libraries 1716 typically provide functionality that allows other software modules to perform tasks in an easier fashion than to interface directly with the underlying operating system 1714 functionality (e.g., kernel 1728, services 1730, and/or drivers 1732). The libraries 1716 may include system libraries 1734 (e.g., C standard library) that may provide functions such as memory allocation functions, string manipulation functions, mathematic functions, and the like. In addition, the libraries 1716 may include API libraries 1736 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1716 may also include a wide variety of other libraries 1738 to provide many other APIs to the applications 1720 and other software components/modules.

The frameworks/middleware 1718 may provide a higher-level common infrastructure that may be utilized by the applications 1720 or other software components/modules. For example, the frameworks/middleware 1718 may provide various graphic user interface (GUI) functions, high-level resource management, high-level location services, and so forth. The frameworks/middleware 1718 may provide a broad spectrum of other APIs that may be utilized by the applications 1720 or other software components/modules, some of which may be specific to a particular operating system or platform.

The applications 1720 include built-in applications 1740 or third party applications 1742. Examples of representative built-in applications 1740 may include, but are not limited to, a contacts application, a browser application, a book reader application, a location application, a media application, a messaging application, or a game application. The third party applications 1742 may include any of the built in applications 1740 as well as a broad assortment of other applications. In a specific example, the third party application 1742 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1742 may invoke the API calls 1724 provided by the mobile operating system such as the operating system 1714 to facilitate functionality described herein.

The applications 1720 may utilize built-in operating system functions (e.g., kernel 1728, services 1730, and/or drivers 1732), libraries (e.g., system libraries 1734, API libraries 1736, and other libraries 1738), and frameworks/middleware 1718 to create user interfaces to interact with users of the system. Alternatively, or additionally, in some systems, interactions with a user may occur through a presentation layer, such as the presentation layer 1744. In these systems, the application/module "logic" can be separated from the aspects of the application/module that interact with a user.

Some software architectures utilize virtual machines. In the example of FIG. 17, this is illustrated by a virtual machine 1748. A virtual machine creates a software environment where applications/modules can execute as if they were executing on a hardware machine (e.g., the machine of FIG. 16). A virtual machine is hosted by a host operating system (e.g., operating system 1714) and typically, although not always, has a virtual machine monitor 1746, which manages the operation of the virtual machine 1748 as well as the interface with the host operating system (e.g., operating system 1714). A software architecture executes within the virtual machine 1748 such as an operating system 1750, libraries 1752, frameworks 1754, applications 1756, or presentation layer 1758. These layers of software architecture executing within the virtual machine 1748 can be the same as corresponding layers previously described or may be different.

Figure 18:
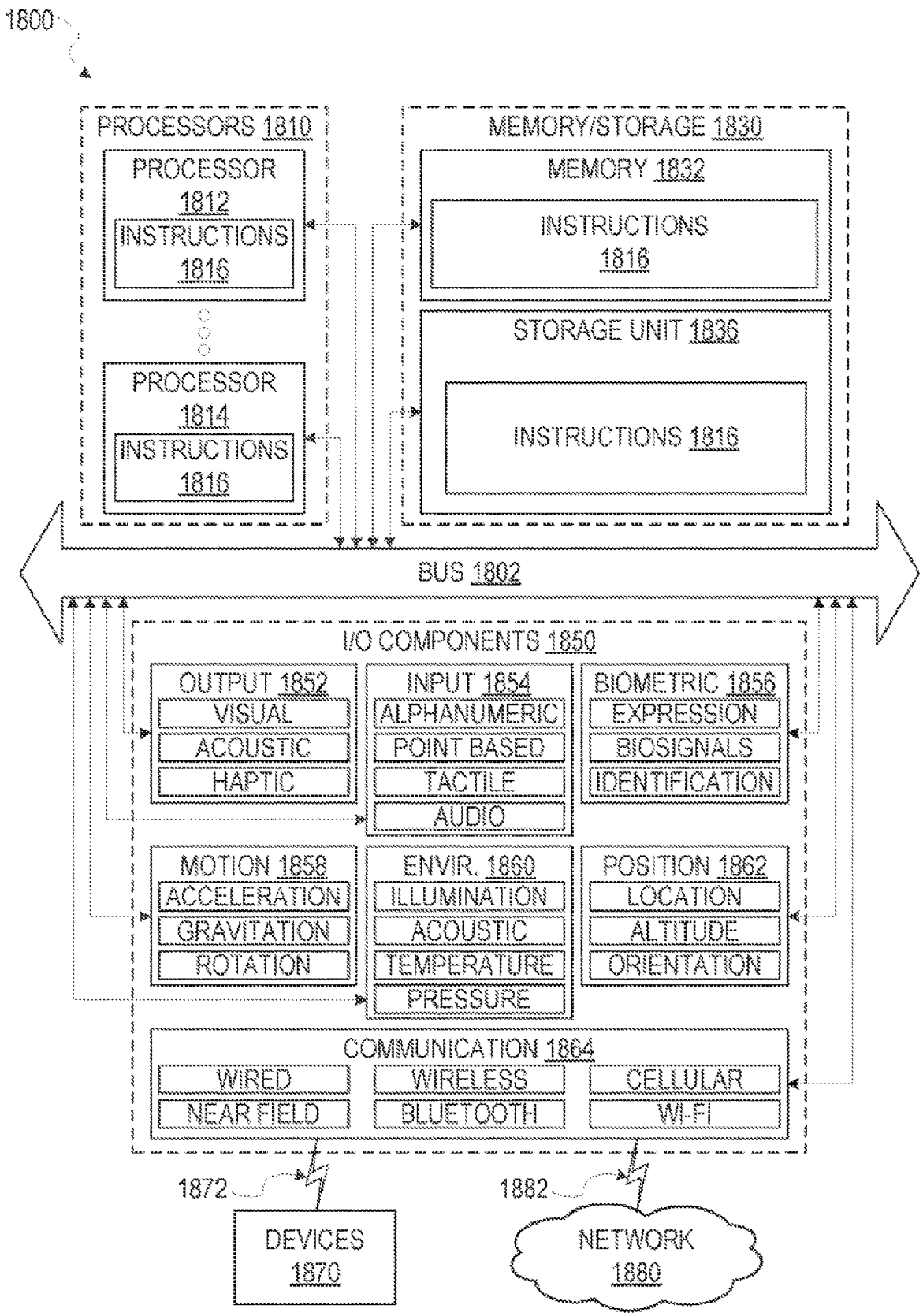
FIG. 18 is a diagrammatic representation of a machine in the form of a computer system within which a set of instructions may be executed for causing the machine to perform any one or more of the methodologies discussed herein, according to an example embodiment.

FIG. 18 is a block diagram illustrating components of a machine 1800, according to some example embodiments, able to read instructions from a machine-readable medium (e.g., a machine-readable storage medium) and perform any one or more of the methodologies discussed herein. Specifically, FIG. 18 shows a diagrammatic representation of the machine 1800 in the example form of a computer system, within which instructions 1816 (e.g., software, a program, an application, an applet, an app, or other executable code) for causing the machine 1800 to perform any one or more of the methodologies discussed herein may be executed. For example the instructions may cause the machine to execute any of the operations discussed with respect to FIGS. 4-15, and so forth. The instructions transform the general, non-programmed machine into a particular machine programmed to carry out the described and illustrated functions in the manner described. In alternative embodiments, the machine 1800 operates as a standalone device or may be coupled (e.g., networked) to other machines. In a networked deployment, the machine 1800 may operate in the capacity of a server machine or a client machine in a server-client network environment, or as a peer machine in a peer-to-peer (or distributed) network environment. The machine 1800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1816, sequentially or otherwise, that specify actions to be taken by machine 1800. Further, while only a single machine 1800 is illustrated, the term "machine" shall also be taken to include a collection of machines 1800 that individually or jointly execute the instructions 1816 to perform any one or more of the methodologies discussed herein.

The machine 1800 may include processors 1810, memory 1830, and I/O components 1850, which may be configured to communicate with each other such as via a bus 1802. In an example embodiment, the processors 1810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1812 and processor 1814 that may execute instructions 1816. The term "processor" is intended to include multi-core processor that may comprise two or more independent processors (sometimes referred to as "cores") that may execute instructions contemporaneously. Although FIG. 18 shows multiple processors, the machine 1800 may include a single processor with a single core, a single processor with multiple cores (e.g., a multi-core process), multiple processors with a single core, multiple processors with multiples cores, or any combination thereof.

The memory/storage 1830 may include a memory 1832, such as a main memory, or other memory storage, and a storage unit 1836, both accessible to the processors 1810 such as via the bus 1802. The storage unit 1836 and memory 1832 store the instructions 1816 embodying any one or more of the methodologies or functions described herein. The instructions 1816 may also reside, completely or partially, within the memory 1832, within the storage unit 1836, within at least one of the processors 1810 (e.g., within the processor's cache memory), or any suitable combination thereof, during execution thereof by the machine 1800. Accordingly, the memory 1832, the storage unit 1836, and the memory of processors 1810 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1816. The term "machine-readable medium" shall also be taken to include any medium, or combination of multiple media, that is capable of storing instructions (e.g., instructions 1816) for execution by a machine (e.g., machine 1800), such that the instructions, when executed by one or more processors of the machine 1800 (e.g., processors 1810), cause the machine 1800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1850 may include a wide variety of components to receive input, provide output, produce output, transmit information, exchange information, capture measurements, and so on. The specific I/O components 1850 that are included in a particular machine will depend on the type of machine. For example, portable machines such as mobile phones will likely include a touch input device or other such input mechanisms, while a headless server machine will likely not include such a touch input device. It will be appreciated that the I/O components 1850 may include many other components that are not shown in FIG. 18. The I/O components 1850 are grouped according to functionality merely for simplifying the following discussion and the grouping is in no way limiting. In various example embodiments, the I/O components 1850 may include output components 1852 and input components 1854. The output components 1852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1850 may include biometric components 1856, motion components 1858, environmental components 1860, or position components 1862 among a wide array of other components. For example, the biometric components 1856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1858 may include acceleration sensor components (e.g., accelerometer), gravitation sensor components, rotation sensor components (e.g., gyroscope), and so forth. The environmental components 1860 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1850 may include communication components 1864 operable to couple the machine 1800 to a network 1880 or devices 1870 via coupling 1882 and coupling 1872 respectively. For example, the communication components 1864 may include a network interface component or other suitable device to interface with the network 1880. In further examples, communication components 1864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1870 may be another machine or any of a wide variety of peripheral devices (e.g., a peripheral device coupled via a Universal Serial Bus (USB)).

Moreover, the communication components 1864 may detect identifiers or include components operable to detect identifiers. For example, the communication components 1864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1864, such as, location via Internet Protocol (IP) geo-location, location via Wi-Fi® signal triangulation, location via detecting a NFC beacon signal that may indicate a particular location, and so forth.

In various example embodiments, one or more portions of the network 1880 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1880 or a portion of the network 1880 may include a wireless or cellular network and the coupling 1882 may be a Code Division Multiple Access (CDMA) connection, a Global System for Mobile communications (GSM) connection, or other type of cellular or wireless coupling. In this example, the coupling 1882 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1816 may be transmitted or received over the network 1880 using a transmission medium via a network interface device (e.g., a network interface component included in the communication components 1864) and utilizing any one of a number of well-known transfer protocols (e.g., hypertext transfer protocol (HTTP)). Similarly, the instructions 1816 may be transmitted or received using a transmission medium via the coupling 1872 (e.g., a peer-to-peer coupling) to devices 1870. The term "transmission medium" shall be taken to include any intangible medium that is capable of storing, encoding, or carrying instructions 1816 for execution by the machine 1800, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although an embodiment has been described with reference to specific example embodiments, it will be evident that various modifications and changes can be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   at least one hardware processor; and
   a non-transitory computer-readable medium storing executable instructions that, when executed, cause the at least one hardware processor to perform operations comprising:
      receiving a first request to access an online resource, the first request comprising a metering event;
      receiving an enforcement decision corresponding to the metering event of the first request, the enforcement decision comprising an instruction to either permit or deny access to the online resource, the enforcement decision received asynchronously from processing of the first request;
      storing the enforcement decision corresponding to the metering event of the first request; and
      triggering, responsive to receiving a second request to access the online resource, a response using the stored enforcement decision corresponding to the metering event of the first request.

2. The system of claim 1, wherein the enforcement decision corresponding to the metering event of the first request is determined after the receiving of the first request and before the receiving of the second request.

3. The system of claim 1, wherein the metering event of the first request indicates a type of request.

4. The system of claim 1, wherein the enforcement decision corresponding to the metering event of the first request is determined based on a history of usage of the online resource and one or more rules.

5. The system of claim 4, wherein the one or more rules comprises one or more of a maximum limit of requests that can be serviced within a predetermined period of time, a maximum limit of a type of request that can be serviced within a predetermined period of time, a maximum limit of requests or types of requests associated with a single Internet Protocol (IP) address that can be serviced within a predetermined period of time, and a maximum limit of requests or types of requests associated with a particular mobile device that can be serviced within a predetermined period of time.

6. The system of claim 1, wherein the first request is received from an online application.

7. The system of claim 6, wherein the online application comprises a web application.

8. A computer-implemented method comprising:
   receiving a first request to access an online resource, the first request including a metering event;
   receiving an enforcement decision corresponding to the metering event of the first request, the enforcement decision including an instruction to either permit or deny access to the online resource, the enforcement decision received asynchronously from processing of the first request;
   storing the enforcement decision corresponding to the metering event of the first request; and
   triggering, responsive to receiving a second request to access the online resource, a response using the stored enforcement decision corresponding to the metering event of the first request.

9. The computer-implemented method of claim 8, wherein the enforcement decision corresponding to the metering event of the first request is determined after the receiving of the first request and before the receiving of the second request.

10. The computer-implemented method of claim 8, wherein the metering event of the first request indicates a type of request.

11. The computer-implemented method of claim 8, wherein the enforcement decision corresponding to the metering event of the first request is determined based on a history of usage of the online resource and one or more rules.

12. The computer-implemented method of claim 11, wherein the one or more rules comprises one or more of a maximum limit of requests that can be serviced within a predetermined period of time, a maximum limit of a type of request that can be serviced within a predetermined period of time, a maximum limit of requests or types of requests associated with a single Internet Protocol (IP) address that can be serviced within a predetermined period of time, and a maximum limit of requests or types of requests associated with a particular mobile device that can be serviced within a predetermined period of time.

13. The computer-implemented method of claim 8, wherein the first request is received from an online application.

14. The computer-implemented method of claim 13, wherein the online application comprises a web application.

15. The computer-implemented method of claim 8, wherein the receiving of the first request is by an application, the receiving of the enforcement decision is by the application, the storing of the enforcement decision is by the application, and the triggering of the response is by the application.

16. A non-transitory machine-readable storage medium storing a set of instructions that, when executed by at least one processor, causes the at least one processor to perform operations comprising:
   receiving a first request to access an online resource, the first request comprising a metering event;
   receiving an enforcement decision corresponding to the metering event of the first request, the enforcement decision comprising an instruction to either permit or deny access to the online resource, the enforcement decision received asynchronously from processing of the first request;
   storing the enforcement decision corresponding to the metering event of the first request; and
   triggering, responsive to receiving a second request to access the online resource, a response using the stored enforcement decision corresponding to the metering event of the first request.

17. The non-transitory machine-readable storage medium of claim 16, wherein the enforcement decision corresponding to the metering event of the first request is determined after the receiving of the first request and before the receiving of the second request.

18. The non-transitory machine-readable storage medium of claim 16, wherein the metering event of the first request indicates a type of request.

19. The non-transitory machine-readable storage medium of claim 16, wherein the enforcement decision corresponding to the metering event of the first request is determined based on a history of usage of the online resource and one or more rules.

20. The non-transitory machine-readable storage medium of claim 19, wherein the one or more rules comprises one or more of a maximum limit of requests that can be serviced within a predetermined period of time, a maximum limit of a type of request that can be serviced within a predetermined period of time, a maximum limit of requests or types of requests associated with a single Internet Protocol (IP) address that can be serviced within a predetermined period of time, and a maximum limit of requests or types of requests associated with a particular mobile device that can be serviced within a predetermined period of time.

* * * * *